United States Patent
Choi et al.

(10) Patent No.: US 11,551,643 B2
(45) Date of Patent: Jan. 10, 2023

(54) DISPLAY APPARATUS AND METHOD OF CONTROLLING THEREOF

(71) Applicant: SAMSUNG ELECTRONICS CO., LTD., Suwon-si (KR)

(72) Inventors: Junsik Choi, Suwon-si (KR); Sunghyun Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/072,149

(22) Filed: Oct. 16, 2020

(65) Prior Publication Data

US 2021/0210052 A1 Jul. 8, 2021

Related U.S. Application Data

(60) Provisional application No. 62/956,696, filed on Jan. 3, 2020.

(30) Foreign Application Priority Data

Jan. 6, 2020 (KR) .................. 10-2020-0001435

(51) Int. Cl.
*G06F 3/0484* (2022.01)
*G09G 5/14* (2006.01)
(Continued)

(52) U.S. Cl.
CPC .............. *G09G 5/14* (2013.01); *G06F 1/1605* (2013.01); *G06F 3/14* (2013.01); *G09G 5/38* (2013.01);
(Continued)

(58) Field of Classification Search
CPC ......... G06F 3/04845; G06F 2200/1614; G06F 2200/1637; G09G 2340/0492; G06T 3/60
See application file for complete search history.

(56) References Cited

U.S. PATENT DOCUMENTS 7,440,036 B2 10/2008 Onomatsu et al.
9,628,744 B2 4/2017 Phang et al.
(Continued)

FOREIGN PATENT DOCUMENTS

JP 5-37873 A 2/1993
JP 2008-227679 A 9/2008
(Continued)

OTHER PUBLICATIONS

Communication dated Dec. 25, 2021 by the Korean Intellectual Property Office in counterpart Korean Patent Application No. 10-2020-0112077.
(Continued)

*Primary Examiner* — Kevin M Nguyen
(74) *Attorney, Agent, or Firm* — Sughrue Mion, PLLC

(57) ABSTRACT

A display apparatus including a communication module comprising circuitry; a display; a motor configured to rotate the display; a user input module; a memory storing at least one instruction; and a processor in communication with the communication module, the display, the motor, the user input module, and the memory to control the display apparatus. The processor, upon execution of the stored at least one instruction, is configured to control the display to display a first screen based on the display being placed in a first orientation, and based on a first user command being input through the user input module while the first screen is displayed, control the display to display at least one second screen having a history of being displayed on the display and information on the display orientation of the at least one second screen being displayed.

17 Claims, 27 Drawing Sheets

(51) Int. Cl.
   *G06F 1/16*   (2006.01)
   *G06F 3/14*   (2006.01)
   *G09G 5/38*   (2006.01)

(52) U.S. Cl.
   CPC ....... *G06F 3/0484* (2013.01); *G09G 2354/00* (2013.01); *G09G 2370/00* (2013.01)

(56) References Cited

U.S. PATENT DOCUMENTS

| | | | |
|---|---|---|---|
| 11,086,494 | B2 | 8/2021 | Suh et al. |
| 2007/0265031 | A1 | 11/2007 | Koizumi et al. |
| 2011/0037609 | A1* | 2/2011 | Kim ................. H04N 21/42222 340/12.22 |
| 2012/0050331 | A1* | 3/2012 | Kanda ............ H04N 21/440263 345/649 |
| 2014/0160078 | A1 | 6/2014 | Seo et al. |
| 2014/0333671 | A1 | 11/2014 | Phang et al. |
| 2014/0358981 | A1* | 12/2014 | Miyake ............... H04L 67/1095 709/201 |
| 2015/0026571 | A1 | 1/2015 | Suh |
| 2015/0029318 | A1 | 1/2015 | Cho |
| 2018/0246634 | A1 | 8/2018 | Suh et al. |
| 2019/0050964 | A1 | 2/2019 | Jang et al. |
| 2019/0377459 | A1 | 12/2019 | Jeong et al. |
| 2020/0026419 | A1 | 1/2020 | Jang et al. |
| 2021/0349610 | A1 | 11/2021 | Suh et al. |

FOREIGN PATENT DOCUMENTS

| | | |
|---|---|---|
| KR | 10-0219944 B1 | 9/1999 |
| KR | 10-0672338 B1 | 1/2007 |
| KR | 10-2007-0070858 A | 7/2007 |
| KR | 10-2012-0132054 A | 12/2012 |
| KR | 10-2014-0133363 A | 11/2014 |
| KR | 10-2014-0146488 A | 12/2014 |
| KR | 10-2015-0010872 A | 1/2015 |
| KR | 10-1702949 B1 | 2/2017 |
| KR | 10-2018-0027820 A | 3/2018 |
| KR | 10-2018-0099352 A | 9/2018 |
| KR | 10-2019-0017614 A | 2/2019 |
| WO | 2015/009079 A1 | 1/2015 |

OTHER PUBLICATIONS

Communication dated Mar. 11, 2021, issued by the International Searching Authority in counterpart International Application No. PCT/KR2020/016177 (PCT/ISA/210 and 237).
Communication dated Apr. 15, 2021, issued by the European Patent Office in counterpart European Application No. 20202125.9.
Communication dated Apr. 25, 2022, issued by the Korean Intellectual Property Office in Korean Patent Application No. 10-2020-0112077.
Communication dated Aug. 10, 2022 by the Korean Patent Office in Korean Patent Application No. 10-2020-0112077.

* cited by examiner

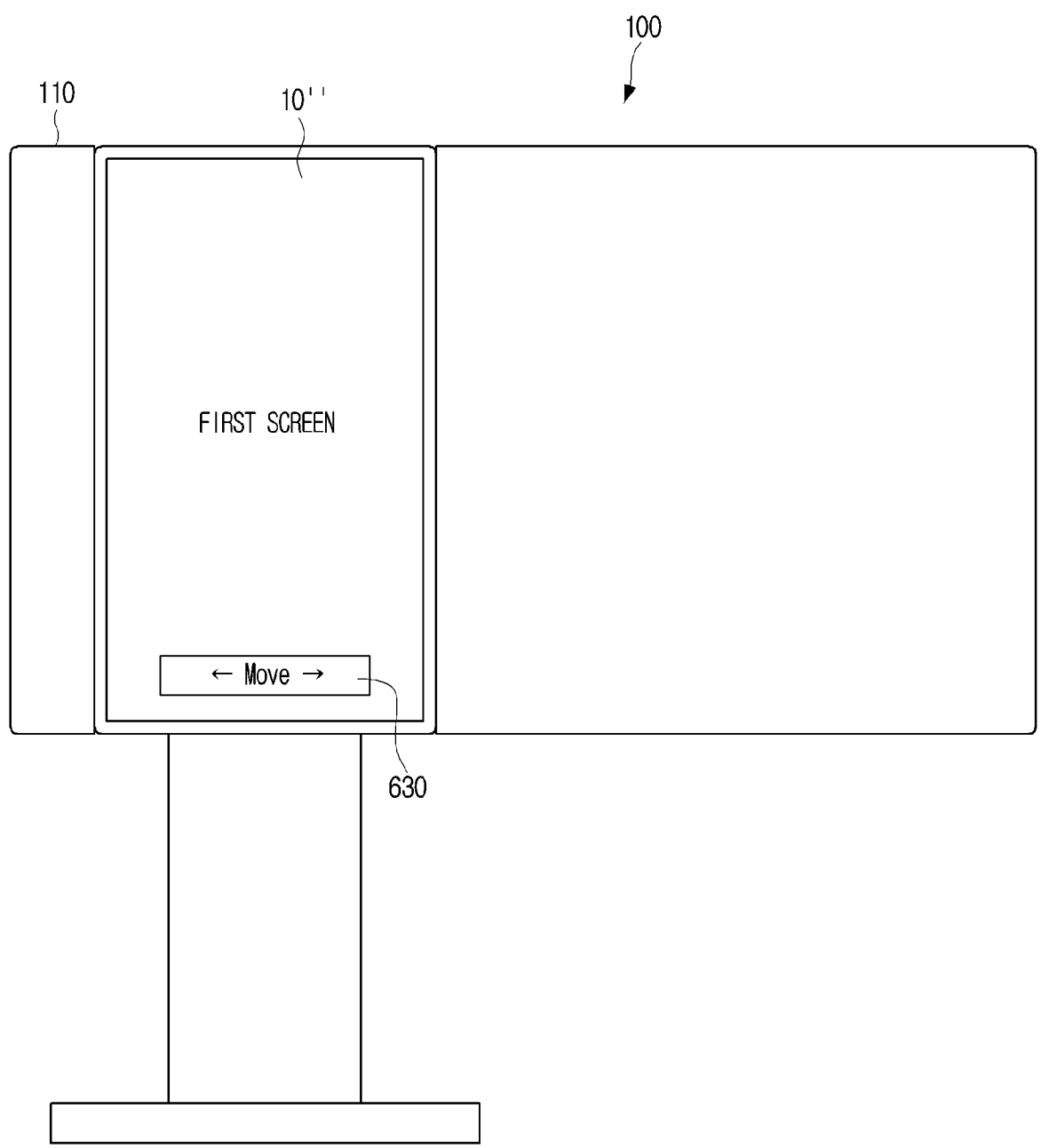

DISPLAY APPARATUS AND METHOD OF CONTROLLING THEREOF

CROSS-REFERENCE TO RELATED APPLICATION(S)

This application is based on and claims priority under 35 U.S.C. § 119(a) to Korean Patent Application No. 10-2020-0001435, filed on Jan. 6, 2020 in the Korean Intellectual Property Office, and U.S. Provisional Patent Application No. 62/956,696, filed on Jan. 3, 2020 in the U.S. Patent and Trademark Office, the disclosures of which are incorporated by references herein in their entirety.

BACKGROUND

1. Field

The disclosure relates to a display apparatus and a method of controlling thereof. More particularly, the disclosure relates to a display apparatus capable of rotating a display and a method of controlling thereof.

2. Description of Related Art

Recently, the time users spend experiencing content through a mobile device such as a smartphone is increasing. Accordingly, web content including social media is provided to match an aspect ratio of a mobile device and gripping orientation of the user's mobile device. In addition, even in the case of video content, which was generally provided in a horizontal orientation, the amount of content provided in the vertical orientation is rapidly increasing.

However, when users view content with a mobile device such as a smartphone, the users may have limited viewing experience compared to viewing content on a display apparatus such as a TV. In addition, a display apparatus such as a TV is generally includes a display having a long edge in a horizontal orientation, so that it is generally insufficient to view vertical content.

In recent years, display apparatuses, such as TVs, are increasingly equipped with a rotatable display so that the display is rotated not only horizontally but also vertically to view content. However, when the display is vertically oriented, a method of browsing various contents or recently connected external device has not been developed.

SUMMARY

According to an aspect of the disclosure, a display apparatus may include a communication module comprising circuitry; a display; a motor configured to rotate the display; a user input module; a memory storing at least one instruction; and a processor in communication with the communication module, the display, the motor, the user input module, and the memory to control the display apparatus. The processor, upon execution of the stored at least one instruction, may be configured to control the display to display a first screen based on the display being placed in a first orientation, and based on a first user command being input through the user input module while the first screen is displayed, control the display to display at least one second screen having a history of being displayed on the display and information on the display orientation of the at least one second screen being displayed.

The processor may be further configured to, based on one second screen being selected, control the display to display content corresponding to the selected second screen.

The processor may be further configured to, based on a display orientation corresponding to the selected second screen being a second orientation, control the motor to rotate the display to the second orientation.

The processor may be further configured to, based on the selected second screen corresponding to an external device having a history of being connected to the display apparatus, control the communication module to initiate a communication connection with the external device corresponding to the selected second screen and control the display to display content received from the corresponding external device through the communication module.

The processor may be further configured to store, in the memory, at least one of title information on the content, a thumbnail of the content, play information on the content, and detailed information on the content transmitted by the corresponding external device to the display apparatus. Each of the at least one second screen may be configured to display at least one of title information on content recently transmitted by the corresponding external device, a thumbnail of the content recently transmitted by the corresponding external device, playback information on the content recently transmitted by the corresponding external device, and detailed information on the content recently transmitted by the corresponding external device.

The content received through the communication module from the corresponding external device may be a content most recently played by the external device.

The processor may be further configured to, based on a screen form of the content most recently transmitted by the external device being in a second orientation, control the motor to rotate a display orientation to the second orientation.

At least one second screen may be configured to display communication connection information for a corresponding external device. The processor may be further configured to, based on the external device corresponding to the selected second screen being disconnected from the communication module, control the display to display a message inquiring about a communication connection with the external device corresponding to the selected second screen.

The processor may be further configured to, based on a second user command being input through the user input module while a highlight is displayed on one second screen, control the display to display at least one third screen corresponding to at least one content recently played through the external device corresponding to the highlighted second screen.

The processor may be further configured to, based on a third user command being input through the user input module while the first screen is displayed, control the display to display at least one fourth screen corresponding to at least one content recently played on the display apparatus.

The processor may be further configured to, based on one fourth screen being selected, control the display to display a UI inquiring about changing the display orientation for playing content corresponding to the at least one fourth screen.

The processor may be further configured to, based on a fourth user command being input through the user input module while the first screen is displayed, display a fifth screen with the first screen to operate in a multi-view mode.

The second screen may be configured to display at least one of a thumbnail corresponding to an internal content stored in the memory and a thumbnail corresponding to content received from an external device.

According to another aspect of the disclosure, a method of controlling a display apparatus including a display and a motor configured to rotate the display may include displaying a first screen based on the display being placed in a first orientation; and displaying, based on a first user command being input through a user input module while the first screen is displayed, at least one second screen having a history of being displayed on the display and information on the display orientation of the at least one second screen being displayed.

The method may further include displaying, based on one second screen being selected, content corresponding to the selected second screen.

The method may further include controlling, based on a display orientation corresponding to the selected second screen being a second orientation, the motor to rotate the display to the second orientation.

Based on the selected second screen corresponding to an external device having a history of being connected to the display apparatus, the displaying the content may include initiating a communication connection with the external device corresponding to the selected second screen and displaying a received content from the corresponding external device.

The method may further include storing at least one of title information on the content, a thumbnail of the content, play information on the content, and detailed information on the content transmitted by the corresponding external devices to the display apparatus, and displaying, on each of the at least one second screen, at least one of title information on content recently transmitted by the corresponding external device, a thumbnail of the content recently transmitted by the corresponding external device, playback information on the content recently transmitted by the corresponding external device, and detailed information on the content recently transmitted by the corresponding external device.

The content received through the communication module from the corresponding external device may be a content most recently played by the corresponding external device.

The method may further include, based on a screen form of the content most recently transmitted by the corresponding external device being in a second orientation, controlling the motor to rotate the display to the second orientation.

BRIEF DESCRIPTION OF THE DRAWINGS

The above and other aspects and features of certain embodiments of the present disclosure will be more apparent from the following detailed description, taken in conjunction with the accompanying drawings, in which:

FIGS. 7A, 7B, 7C, 7D, 7E, and 7F are diagrams of a display apparatus showing a method of controlling a screen displayed on the display apparatus in a state that the display is vertically oriented, according to an embodiment of the disclosure.

DETAILED DESCRIPTION

Figure 1:
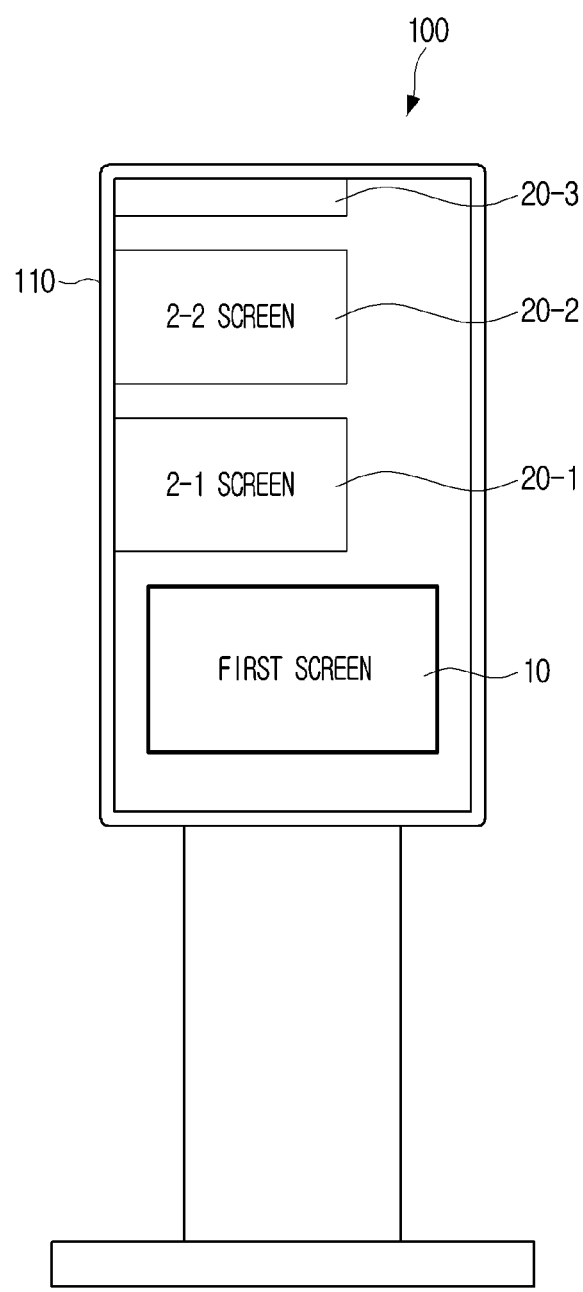
FIG. 1 is a diagram showing a display apparatus displaying multiple screens of recently connected external device according to an embodiment.

The disclosure may have several embodiments, and the embodiments may be modified variously. In the following description, specific example embodiments are provided with accompanying drawings and detailed descriptions thereof. However, it should be understood that the disclosure is not limited to the specific example embodiments described hereinafter, but includes various modifications, equivalents, and/or alternatives of the example embodiments of the disclosure. With respect to explanation of drawings, the same or similar drawing reference numerals may be used in similar constituent elements.

In describing example embodiments, detailed description of relevant known functions or components may be omitted if it would obscure the description of the subject matter.

In addition, the example embodiments may be changed in various forms, and therefore, the technical scope is not limited to the following example embodiments. Rather, these example embodiments are provided to make the disclosure thorough and complete.

The terms used herein are solely intended to explain a specific example embodiment, and not to limit the scope of the disclosure. Singular forms are intended to include plural forms unless the context clearly indicates otherwise.

The terms "have", "may have", "include", and "may include" used in the example embodiments of the present disclosure indicate the presence of corresponding features (e.g., elements such as numerical values, functions, operations, or parts), and do not preclude the presence of additional features.

In this disclosure, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

The expression "1", "2", "first", or "second" as used herein may modify a variety of elements, irrespective of order and/or importance thereof, and only to distinguish one element from another without limiting the corresponding elements.

When an element (e.g., a first element) is "operatively or communicatively coupled with/to" or "connected to" another element (e.g., a second element), an element may be directly coupled with another element or may be coupled through the other element (e.g., a third element).

On the other hand, when an element (e.g., a first element) is "directly coupled with/to" or "directly connected to" another element (e.g., a second element), an element may not be existed between the other element.

In this disclosure, the term "configured to" may be changed to, for example, "suitable for", "having the capacity to", "designed to", "adapted to", "made to", or "capable of" under certain circumstances. The term "configured to (set to)" does not necessarily mean "specifically designed to" in a hardware level.

Under certain circumstances, the term "device configured to" may refer to "device capable of" doing something together with another device or components. For example, "a sub-processor configured to perform A, B, and C" may refer to a generic-purpose processor (e.g., central processing unit (CPU) or an application processor) capable of performing corresponding operations by executing a dedicated processor (e.g., an embedded processor) or one or more software programs stored in a memory device to perform the operations.

In the example embodiments disclosed herein, a term 'module' or 'unit' refers to an element that performs at least one function or operation. The 'module' or 'unit' may refer to hardware, software, or combinations thereof. In addition, a plurality of 'modules' or 'units' may be integrated into at least one module and may be at least one processor in an integrated manner except for 'modules' or 'units' that should be realized in specific hardware.

Further, various elements and areas in the drawings are schematically drawn. Therefore, the technical ideas are not limited by a relative size or interval drawn in the accompanying drawings.

Hereinafter, example embodiments according to the disclosure will be described in detail with reference to the accompanying drawings so that those skilled in the art can easily perform the embodiments.

FIG. 1 is a diagram showing an external device recently connected to a display apparatus according to an embodiment. As shown in FIG. 1, the display apparatus 100 may rotate a display 110 using a motor. In other words, the display apparatus 100 may perform a pivot function. Specifically, the display 110 may be horizontally and vertically rotated. The display 110 shown in FIG. 1 is oriented in vertical orientation, and may be oriented in horizontal orientation after the display 110 rotates. The display 110 may rotate in a counterclockwise orientation, but this is only an example, and the display 110 may also rotate in a clockwise orientation.

Vertically oriented display 110 may refer to an orientation where a longer edge of the display 110 is oriented vertically, and may refer to a portrait state. Horizontally oriented display 110 may refer to an orientation where a longer edge of the display 110 is oriented horizontally, which may be referred to as landscape state.

Also, the state in which the display 110 is placed in a horizontal orientation may be referred to as a state in which the display apparatus 100 operates in a first mode (or landscape mode), and the state in which the display 110 is placed in a vertical orientation may be referred to as a state in which the display apparatus 100 operates in a second mode (or portrait mode).

Hereinafter, in describing the disclosure, the pivoted display 110 being in a horizontal or vertical orientation may indicate that the display rotated to a horizontal or vertical orientation. The display apparatus 100 may be implemented as, for example, a digital TV, a monitor, or the like, but is not particularly limited thereto.

According to an example embodiment, the display apparatus 100 may display a first screen 10 in a state in which the display 110 is placed in a first orientation (i.e., a vertical orientation). The first screen 10 may be located on a partial area of the display 110 to display content, but this is only an example embodiment, and the first screen 10 may be located on an entire area of the display to display content. The content may include at least one of video content, photo content, music content, game content, and e-book content, but is not limited thereto.

When a first user command is input while the first screen 10 is displayed, the display apparatus 100 may display at least one second screen corresponding to an external device having a history of being connected to the display apparatus 100. Specifically, as shown in FIG. 1, the display apparatus 100 may display the first screen 10 at the bottom of the display 110, and display a 2-1 screen 20-1, a 2-2 screen 20-2, and a 2-3 screen 20-3. In this case, the 2-1 screen 20-1 may be a first screen corresponding to a first external device having a history of being connected to the display apparatus 100, the 2-2 screen 20-2 may be a second screen corresponding to the first external device, and the 2-3 screen 20-3 may be a third screen corresponding to the first external device. In addition, the 2-1 screen 20-1, the 2-2 screen 20-2, and the 2-3 screen 20-3 may be arranged in a time sequence in which the corresponding external device is connected to the display apparatus 100.

An external device having a history of being connected to the display apparatus 100 may be an external device that previously communicated with the display apparatus 100 to provide a corresponding second screen. For example, the 2-1 screen 20-1 may correspond to an external device having a second screen on the display apparatus 100 in a previous viewing session. A second screen having a history of being displayed on the display 110 may be a second screen that was displayed on the display 110 in a previous viewing session. The second screen having a history of being displayed on the display 110 may correspond to an external device having a history of being connected to the display apparatus 100.

Each of the second screens 20-1, 20-2, and 20-3 may include at least one of title information on content recently transmitted by a corresponding external device, thumbnails of content recently transmitted by the corresponding external device, playback information on content recently transmitted by the corresponding external device, and detailed information on the content recently transmitted by the corresponding external device. At least one of the title information on content, the thumbnail on content, the playback information on content, and the detailed information on content may be stored in a memory of the display apparatus 100 when the external device is connected to the display apparatus 100 or when the external device transmits content to the display apparatus 100 to play the content. Also, each of the second screens 20-1, 20-2, and 20-3 may include communication connection information for a corresponding external device.

The display apparatus 100 may select one of the second screens 20-1, 20-2, and 20-3 based on a user input. In this case, the display apparatus 100 may select one of second screens 20-1, 20-2, and 20-3 by moving a highlight, but this is only an example, and may select one of the second screens 20-1, 20-2, and 20-3 using a user touch, cursor, or other methods known in the art.

When one of the second screens 20-1, 20-2, and 20-3 is selected, the display apparatus 100 may communicate with an external device corresponding to the selected second screen, and may display content received from the external device connected. For example, when the 2-1 screen 20-1 is selected, the display apparatus 100 may communicate with the external device corresponding to the 2-1 screen 20-1.

Specifically, since the display apparatus 100 has previously been in communication with the external device, it may initiate a communication connection with the external device based on pre-stored information on the external device (e.g., Mac address information of the external device, etc.). In addition, when an external device corresponding to the selected second screen is not communicatively connected (that is, when the external device corresponding to the selected second screen is not discovered), the display apparatus 100 may display a message requesting a communication connection be initiated with the external device corresponding to the second screen.

When a communication connection is made between the display apparatus 100 and an external device, the display apparatus 100 may receive content from the external device corresponding to the second screen associated with the external device. In this case, the content received from the external device may be content that the external device most recently played. For example, when a screen form (or resolution) of the content that the external device most recently transmitted is in a second orientation (i.e., horizontal orientation), the display apparatus 100 may control a motor to rotate the display to the second orientation. In this case, the display apparatus 100 may directly rotate the display, but this is only an example, and display apparatus 100 may display a message asking the user if the display should be rotated.

When one of the second screens is selected, the display apparatus 100 may remove the remaining screens except the selected second screen from the display and play the content received from the external device on the selected second screen. This is only an example embodiment, and the display apparatus 100 may play content received from an external device on the selected second screen while maintaining the first screen and at least one second screen. In addition, the display apparatus 100 may play the content by enlarging the selected second screen to fill the entire screen.

Also, when a second user command is input while a highlight is displayed on one of the second screens, the display apparatus 100 may display at least one third screen corresponding to at least one content recently played through an external device corresponding to the second screen on which the highlight is displayed.

In addition, the display apparatus 100 may provide screens corresponding to the most recently played content, a multi-view mode for providing a plurality of contents, and various functions of the screen. This will be described in detail with reference to FIGS. 6A to 7F.

Figure 2:
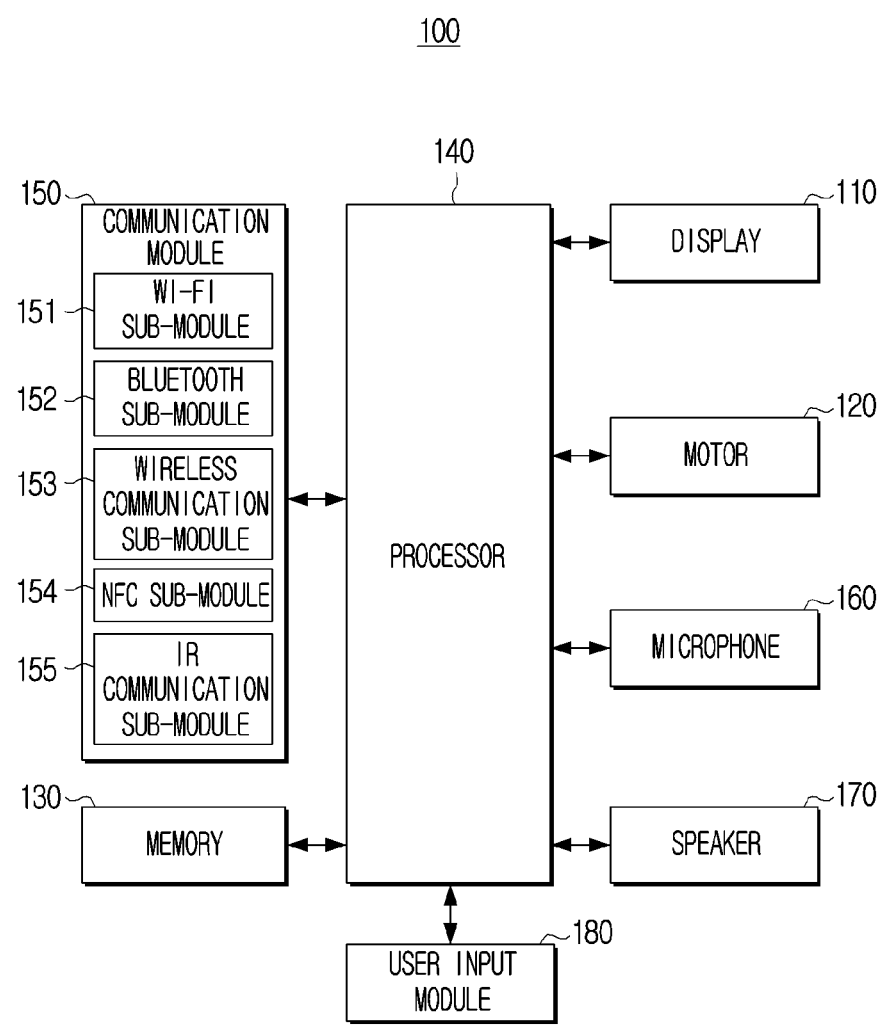
FIG. 2 is a diagram showing a configuration of an electronic apparatus according to an embodiment.

FIG. 2 is a diagram showing a configuration of a display apparatus according to an embodiment. As shown in FIG. 2, the display apparatus 100 according to an embodiment may include a display 110, a motor 120, a memory 130, a communication module 150, a microphone 160, a speaker 170, a user input module 180, and the processor 140. However, such components are exemplary, and a new component may be added or some components may be omitted.

The display 110 may output image data under the control of the processor 140. The display 110 may output an image stored in the memory 130 under control of the processor 140. In particular, the display 110 may display a user interface stored in the memory 130.

The display 110 may be implemented as a liquid crystal display panel (LCD), organic light emitting diodes (OLED), or the like, and the display 110 may be implemented as a flexible display 110, a transparent display 110, or the like in some cases. However, the display 110 is not limited to a specific type.

In various example embodiments, the display apparatus 100 may perform a pivot function. Specifically, the display 110 may be rotated to be oriented in horizontal or vertical orientation. Hereinafter, in describing the disclosure, pivoting the display 110 to be placed in a horizontal or vertical orientation is simply describing that the display is rotated to horizontal or vertical orientation. The display 110 may be manually rotated by the user, and may also be automatically rotated by the processor 140 controlling the motor 120 for rotating the display 110.

The motor 120 may rotate the display 110. The motor 120 may be coupled to the display 110 and may be driven to rotate the display 110 clockwise or counterclockwise by the control of the processor 140. Accordingly, the display 110 may be rotated to a horizontal or vertical orientation. The motor 120 may be implemented with various types of motors such as a direct current electric motor (DC motor), an alternating current electric motor (AC motor), a brushless DC electric motor (BLDC) motor, or the like.

At least one command related to the display apparatus 100 may be stored in the memory 130. In addition, an operating system (O/S) for driving the display apparatus 100 may be stored in the memory 130. In addition, various software programs or applications for operating the display apparatus 100 may be stored in the memory 130. Further, the memory 130 may include a semiconductor memory such as a flash memory or a magnetic storage medium such as a hard disk.

The memory 130 may store various software modules to operate the display apparatus 100 in accordance with various embodiments, the processor 140 may execute various software modules stored in memory 130 to control the operation of the display apparatus 100. In other words, the memory 130 may be accessed by the processor 140 which may perform readout, recording, correction, deletion, update, and the like, on data.

The term memory used herein may include the memory 130, a Read Only Memory (ROM) (not shown) in the processor 140, and a memory card (not shown) (e.g., a micro SD card, a memory stick) mounted in a Random Access Memory (RAM) (not shown) or the display apparatus 100.

In various embodiments of the disclosure, when an external device is connected to the display apparatus 100 and content is received from the external device, the memory 130 may store information on the external device and information on the received content (e.g., title information on the content, thumbnails for content, playback information on content, detailed information on content, etc.). In addition, when the display apparatus 100 plays the content, the memory 130 may store information on the played content (e.g., title information on the content, thumbnails for content, playback information on content, detailed information on content, etc.).

The communication module 150 may include a circuit, and may communicate with a server or an external device. Specifically, the processor 140 may receive various data or information from a server or an external device connected through the communication module 150, or may transmit various data or information to the server or the external device.

The communication module 150 may include at least one of a Wi-Fi sub-module 151, a Bluetooth sub-module 152, a wireless communication sub-module 153, a near field communication (NFC) sub-module, and an infrared (IR) communication sub-module 155. The Wi-Fi sub-module 151 and the Bluetooth sub-module 152 may perform communication using a Wi-Fi method and a Bluetooth method, respectively. When the Wi-Fi sub-module 151 or the Bluetooth sub-module 152 is used, a variety of connectivity information, such as SSID, or the like, and a session key may be transmitted and received first, and communication is established using the connectivity information, and then a variety of information may be transmitted and received.

The wireless communication sub-module 153 may perform communication according to the various communication standards such as IEEE, Zigbee, 3rd Generation (3G), 3rd Generation Partnership Project (3GPP), Long Term Evolution (LTE), 5th generation (5G), and so on. The NFC sub-module 154 may perform communication in a Near Field Communication (NFC) method using a 13.56 MHz band among various RF-ID frequency bands, such as 135 kHz, 13.56 MHz, 433 MHz, 860 to 960 MHz, and 2.45 GHz.

In addition, the IR communication sub-module 155 may include an IR receiving sub-module and an IR transmitting sub-module. The IR receiving sub-module may receive an infrared signal output from the outside of the display apparatus 100 and may demodulating the modulated infrared signal, The IR receiving sub-module may include an infrared light receiving transistor (phototransistor) for receiving infrared light. The IR transmission module may output an infrared signal to the outside of the display apparatus 100, and may include an infrared ray emitting diode (IRD) for generating an infrared signal.

In particular, the display apparatus 100 may communicate with an external device through the Bluetooth sub-module 152 or the Wi-Fi sub-module 151. However, this is only an example, and the display apparatus 100 may be connected to an external device through various terminals (e.g., a USB terminal, an HDMI terminal, etc.).

The microphone 160 may receive a voice signal, and convert the received voice signal into an electrical signal. In particular, in various example embodiments, a user command for controlling the display apparatus 100 may be input through the microphone 160. An example embodiment of obtaining a user command corresponding to the received user voice by performing voice recognition on the received user voice, and an example embodiment of determining an intended display orientation based on the type of the obtained user command are described below.

The speaker 170 may output audio data under the control of the processor 140, and the indicator may be turned on under the control of the processor 140. In particular, in various example embodiments, the speaker 170 may output voice content provided according to a user command.

The user input module 180 may receive user input from various input devices. In particular, the user input module 180 may receive various user inputs, such as a user command to move a highlight, a user command to select a screen, or the like. In this case, the user input module 180 may be a remote controller, but this is only an example. The user input module 180 may be various input apparatuses such as keyboard, mouse, touch panel, voice recognition device, motion recognition device, or the like.

The processor 140 may control overall operations of the display apparatus 100. Specifically, the processor 140 may be connected to the display apparatus 100 including the display 110, the motor 120, and the memory 130 as described above, and execute at least one command stored in the memory 130 as described above to control the overall operations of the display apparatus 100.

The processor 140 may be at least one of an application-specific integrated circuit (ASIC), an embedded processor, a microprocessor, hardware control logic, hardware Finite State Machine (FSM), and a digital signal processor (DSP). The term processor 140 may refer to a central processing unit (CPU), a graphics processing unit (GPU), a main processing unit (MPU), or the like.

In an example embodiments, the processor 140 may rotate the display 110 and display content on the rotated display 110. Hereinafter, example embodiments describing the control of the processor 140 will be described with reference to the drawings.

Figure 3A:
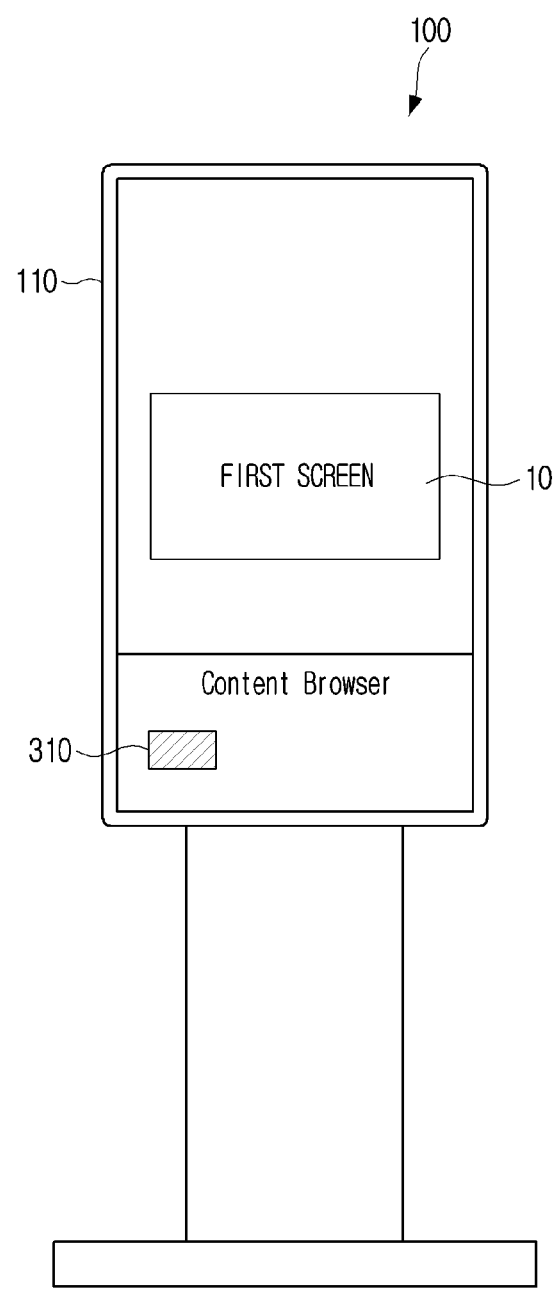
FIGS. 3A, 3B, 3C, 3D, and 3E are diagrams of a display apparatus showing a method of browsing an external device through the display apparatus according to an embodiment.

Specifically, as shown in FIG. 3A, the processor 140 may control the display 110 to display a content browser area 310 and a first screen 10 while the display apparatus 100 is placed in the first orientation (i.e., vertical orientation). In this case, a highlight may be placed on an item included in the content browser area 310. In addition, a first content may be played on the first screen 10, or information (e.g., a title of the first content, a thumbnail of the first content, etc.) on the first content may be displayed. In this case, the first content may be content stored in the memory 130, but this is only an example embodiment, and the first content may be content received from an external source (e.g., a set-top box, DVD, USB, etc.).

Figure 3B:
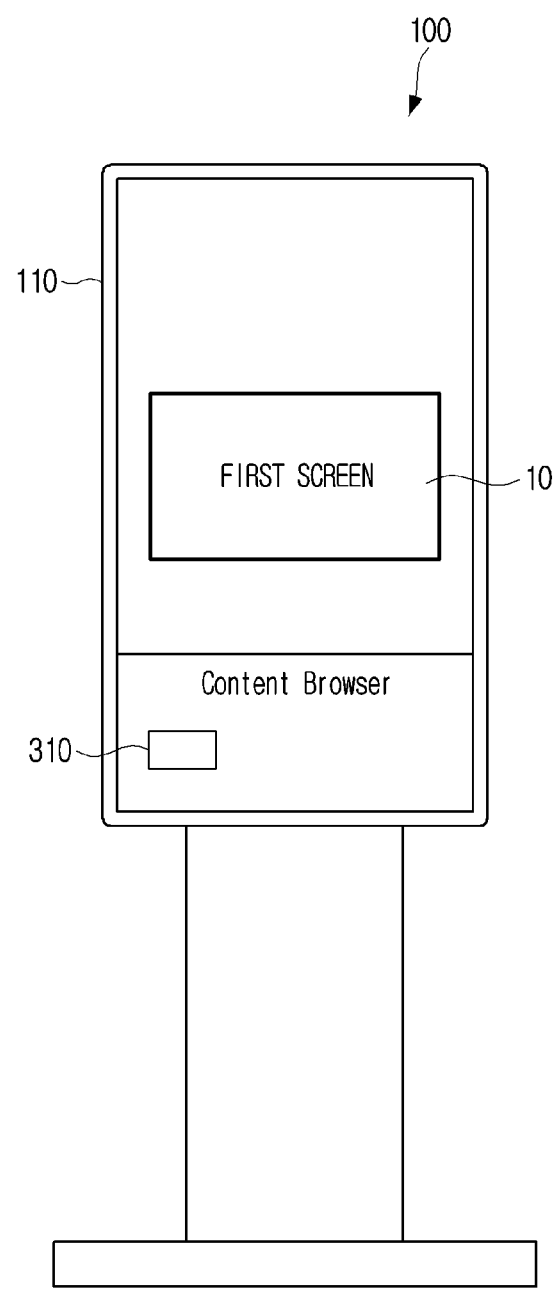

When a user command selecting an up button is input from the user input module 180 while a highlight is placed on an item included in the content browser area 310, the processor 140 may control the display 110 to move the highlight on the first screen 10 as shown in FIG. 3B.

Figure 3C:
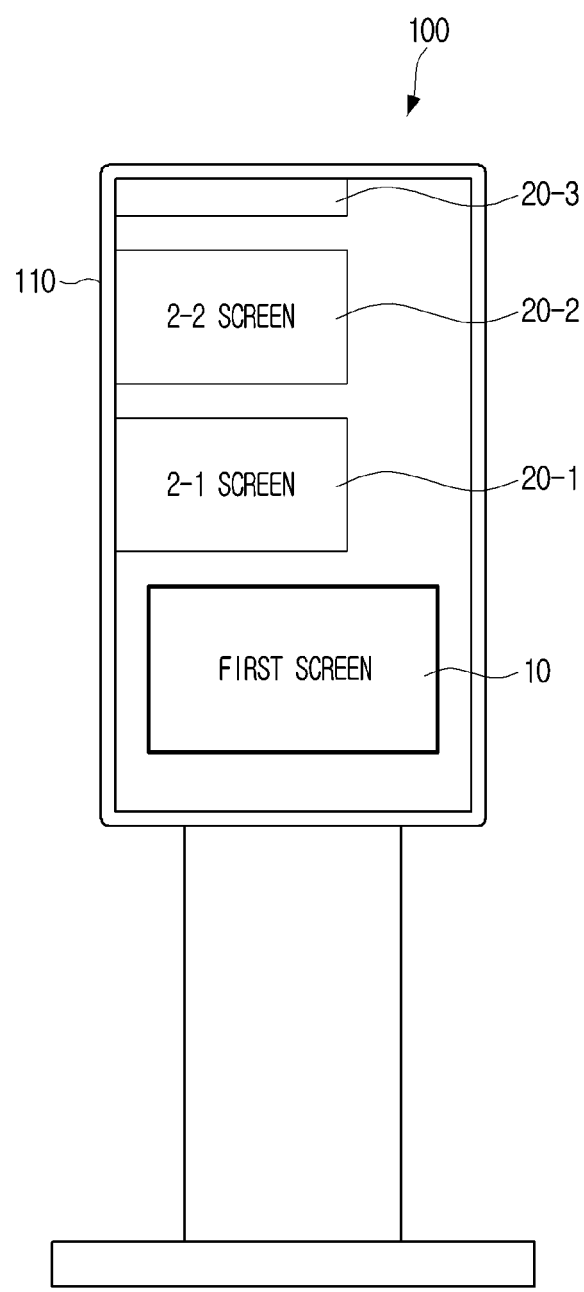

When a user command selecting a left orientation button is input from the user input module 180 while the highlight is displayed on the first screen 320 the processor 140 may control the display 110 to remove the content browser area 310, move the first screen 10 to the bottom of the display 100, and display a 2-1 screen 20-1, a 2-2 screen 20-2, and a 2-3 screen 20-3, as shown in FIG. 3C. FIG. 3C describes that the first screen 10, the 2-1 screen 20-1, the 2-2 screen 20-2, and the 2-3 screen 20-3 are all horizontal screens (that is, the horizontal length is longer than the vertical length), but this is only an example, and the screens may refer to screens in the vertical orientation (i.e., the vertical length is longer than the horizontal length) according to the type of content displayed on the screen.

In this case, the 2-1 screen 20-1 is a screen corresponding to a first external device having a history of being connected to the display apparatus 100, the 2-2 screen 20-2 is a screen corresponding to a second external device having a history of being connected to the display apparatus 100, and the 2-3 screen 20-3 is a screen corresponding to a third external device having a history of being connected to the display apparatus 100. In this case, the first external device may be an external device that is connected to the display apparatus 100 most recently or most frequently. In other words, the 2-1 screen 20-1, the 2-2 screen 20-2, and the 2-3 screen 20-3 may be arranged depending on the recently connected time or the number of connections with the corresponding external device.

In addition, each of the 2-1 screen 20-1, the 2-2 screen 20-2, and the 2-3 screen 20-3 may include information on content most recently provided by the corresponding external device, and information on the external device. In other words, when the content is received through the external device, the memory 130 may store information on the content and information on the external device, and the processor 140 may control the display 110 to display information on the stored content and information on the external device on the corresponding second screen. For example, the processor 140 may control the display 100 to display at least one of title information on the content most recently transmitted from the first external device, thumbnail image on the content most recently transmitted from the first external device, playback information on the content most recently transmitted from the first external device (i.e., the last playback time, etc.), and detailed information on the content most recently transmitted from the first external device (e.g., story information, main character information, etc.) on the 2-1 screen 20-1. In addition, the processor 140 may control the display 110 to display information (e.g., product name, user name, communication connection information, etc.) on the first external device on the 2-1 screen 20-1.

Figure 3D:
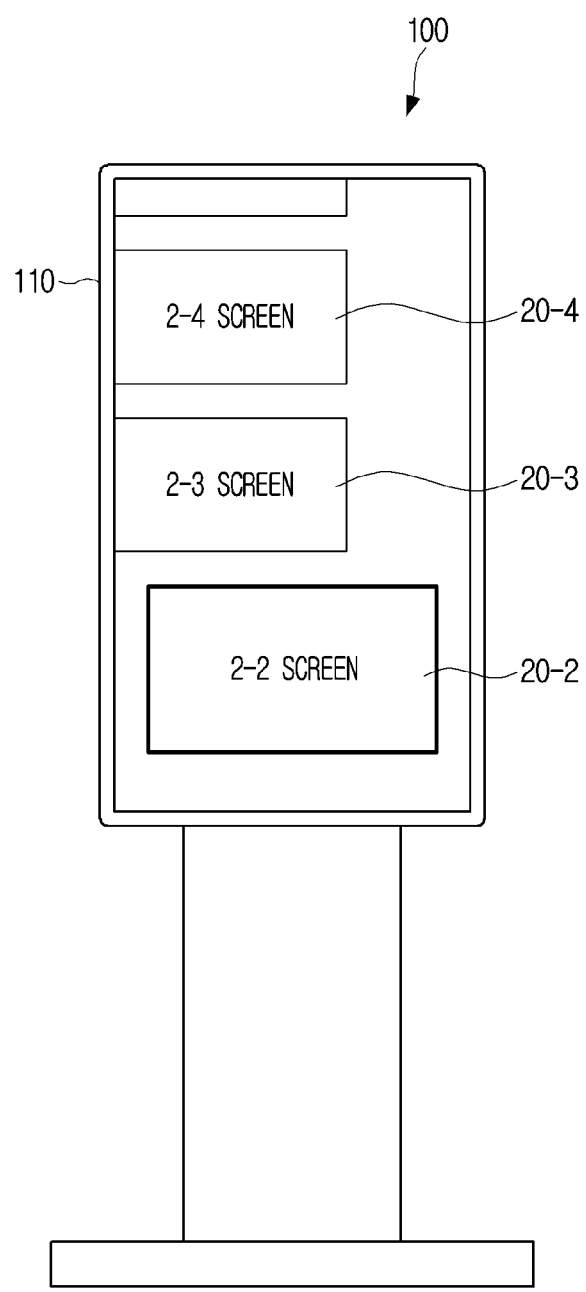

When a user command selecting an up button twice is input through the user input module 180, the processor 140 may control the display 110 to move a highlight to the 2-2 screen 20-2. While the highlight moves to the 2-2 screen 20-2, the processor 140 may remove the first screen 10 and the 2-1 screen 20-1 displayed on the display 110, and control to display the 2-3 screen 20-3 and the 2-4 screen 20-4 as shown in FIG. 3D.

When user command selecting an enter button is input through the user input module 180 while the highlight is displayed on the 2-2 screen 20-2, the processor 140 may communicate with the second external device corresponding to the 2-2 screen 20-2. In this case, since the display 100 has a history of communicating with the second external device, the processor 140 may control the communication module 150 to communicate with the second external device based on pre-stored information on the external device (e.g., Mac address information of the second external device, etc.). When the second external device is not connected to the display apparatus 100, the processor 140 may control the display 110 to display a message requesting a communication connection (e.g., "Bluetooth is not connected. Please connect a Bluetooth.").

Figure 3E:
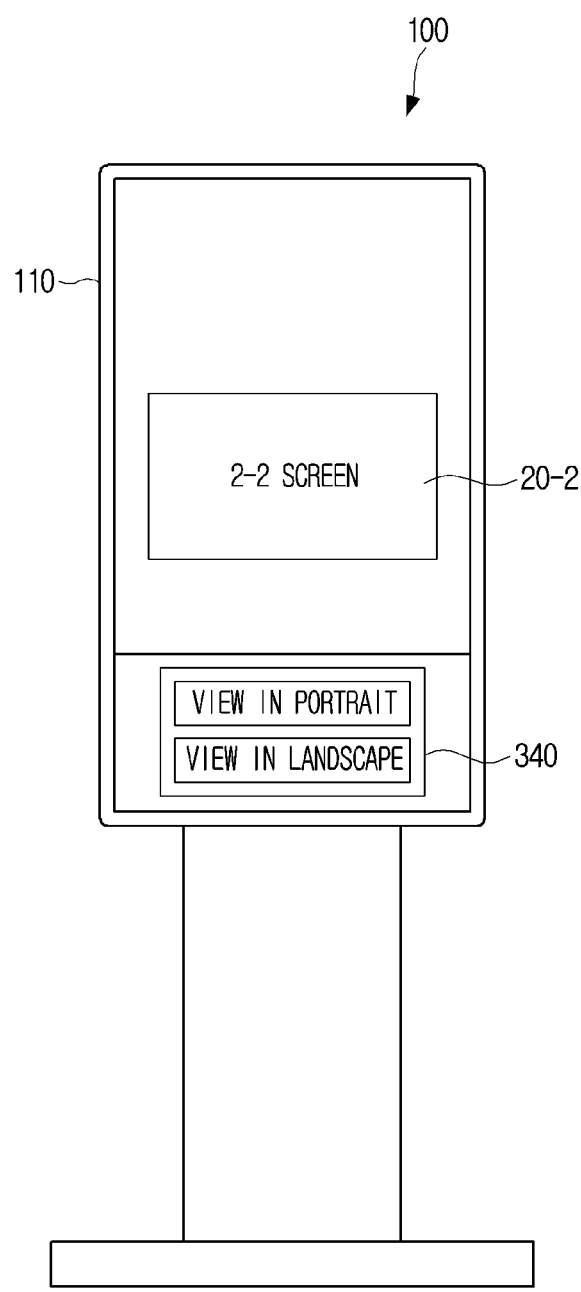

As shown in FIG. 3E, the processor 140 may display the 2-2 screen 20-2 on the display 110, and control the display 110 to display a message 340 inquiring about the display 110 orientation. In this case, content received from the second external device may be displayed on the 2-2 screen 20-2. The content received from the second external device may be content that the second external device most recently transmitted to the display apparatus 100.

In addition, the processor 140 may control the motor 120 to automatically rotate the display 110 based on information on the content that the second external device most recently transmitted to the display apparatus 100. Specifically, when the content that the second external device most recently transmitted to the display apparatus 100 is identified to be optimized when displayed in the horizontal orientation based on information (e.g., resolution, etc.) on the content, the processor 140 may control the motor 120 to rotate the vertical display 110 to the horizontal orientation.

Alternatively, the processor 140 may rotate the display 110 orientation based on the message 340 shown in FIG. 3E. For example, when "the user selects view in landscape", the processor 140 may control the motor 120 to rotate the vertical display 110 to the horizontal orientation.

As described above, by simultaneously providing information on at least one external device that has recently provided content, the display apparatus 100 may simultaneously browse a plurality of contents provided by the external device to find desired content more quickly, thereby improving user convenience.

Figure 4:
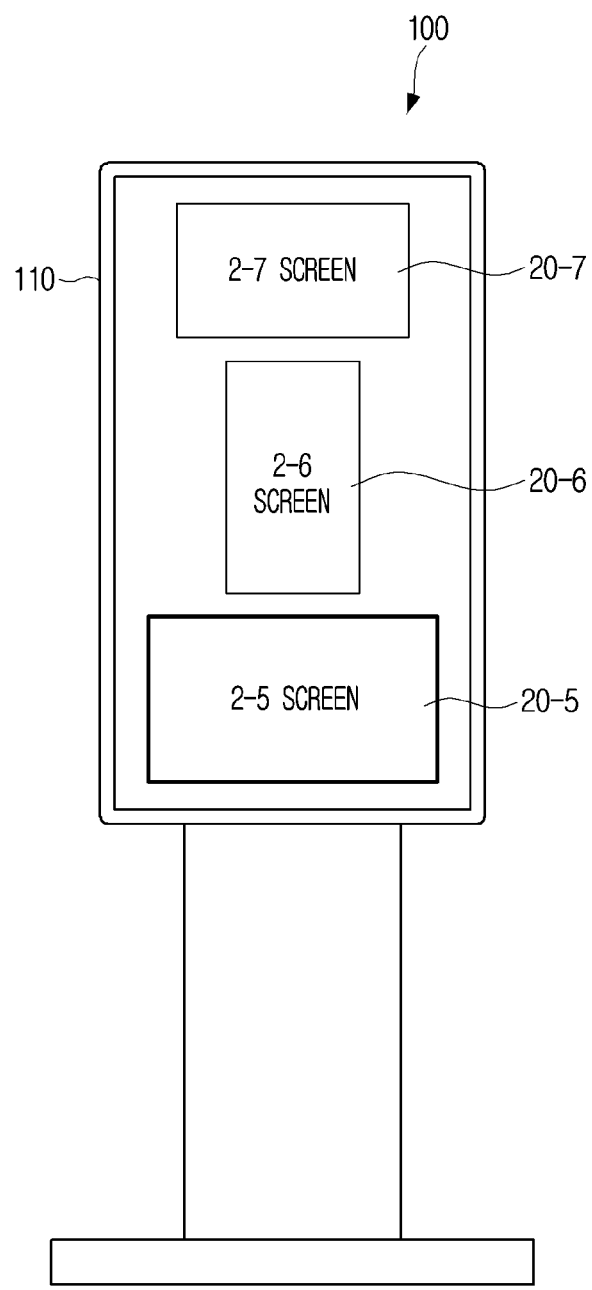
FIG. 4 is a diagram showing a display apparatus displaying multiple screens in different orientations according to an embodiment.

The display apparatus 100 may display information on the display 10 orientation when at least one screen having a history of being displayed on the display 110 is displayed. Specifically, when a screen is displayed, the display apparatus 100 may display the screen so that the orientation information of the display 110 is reflected. For example, as shown in FIG. 4, the display apparatus 100 may display a 2-5 screen 20-5, a 2-6 screen 20-6, and a 2-7 screen 20-7. In this case, the 2-5 screen 20-5 and the 2-7 screen 20-7 may be displayed such that the horizontal length is greater than the vertical length, and the 2-6 screen 20-6 may be displayed such that the vertical length is greater than the horizontal vertical. The 2-5 screen 20-5 may be displayed on the display 110 at a first time point, and the display 110 may be arranged in the horizontal orientation. In other words, at the first time point, the display 110 may display the 2-5 screen 20-5 in the horizontal orientation. As described above, the display apparatus 100 may display the 2-5 screen 20-5 such the display 110 orientation when the 2-5 screen 20-5 is displayed is reflected in the form of the 2-5 screen 20-5 (i.e., the horizontal length is greater than the vertical length).

In addition, if the 2-6 screen 20-6 was displayed on the display 110 at a second time point, and the display 110 may be disposed in the vertical orientation. In other words, at the second time point, the display 110 may display the 2-6 screen 20-6 in the vertical orientation. Accordingly, the display apparatus 100 may display the 2-6 screen 20-6 to have a form (i.e., the vertical length is greater than the horizontal length) in which information on the display 110 orientation at the second time point (i.e., the vertical orientation) is reflected. As such, the display apparatus 100 displays information on the display 110 orientation when the screen is displayed so the user may recognize information on the display 110 orientation, thereby improving user convenience and satisfaction.

An example embodiment in which the display apparatus 100 displays information on the display 110 orientation based on the form of the screen has been described in the above description. However, this is only an example, and the display apparatus 100 may display information on the display orientation by displaying text (e.g., horizontal orientation) referring to information on the display 110 orientation on the screen. For example, the display apparatus 100 may display text indicating vertical orientation on the 2-6 screen 20-6 and text indicating horizontal orientation on the 2-7 screen 20-7. Accordingly, the user may recognize that the display 110 displays the 2-6 screen 20-6 in the vertical orientation when the 2-6 screen 20-6 is displayed.

The display apparatus 100 may display information on a screen state (or resolution) of content displayed on the screen. Specifically, the display apparatus 100 may display the screen as having form in which the content state is reflected to display information on the screen state of the content. For example, a first content having a resolution of 16:9 aspect ratio may be executed at the first time point and may be displayed on the 2-5 screen 20-5. At this time, the display apparatus 100 may display the 2-5 screen 20-5 to have a form to which the resolution of the first content is reflected (i.e., the horizontal length is greater than the vertical length).

Also, the display apparatus 100 may provide at least one screen corresponding to at least one content that the display apparatus 100 has recently played.

Figure 5A:
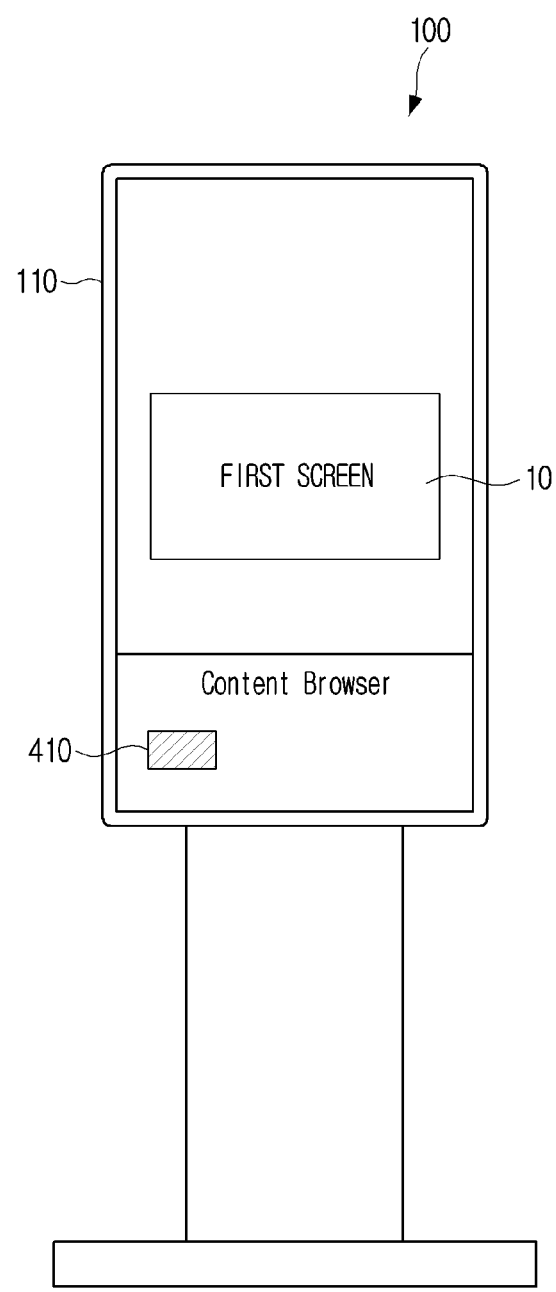
FIGS. 5A, 5B, 5C, 5D, and 5E are diagrams of a display apparatus showing a method of browsing content recently played on the display apparatus according to an embodiment.

Specifically, as shown in FIG. 5A, the processor 140 may control the display 110 to display a content browser area 410 and a first screen 10 while the display apparatus 100 is placed in the first orientation (that is, vertical orientation). In this case, a highlight may be placed on an item included in the content browser area 410. In addition, a content may be played on the first screen 10 and information on the content (e.g., a title of content, a thumbnail of the content, etc.) may be displayed on the first screen 10. The content displayed on the first screen 10 may be content stored in the memory 130, but this is only an embodiment, and may be content received from an external source (e.g., set-top box, DVD, USB, etc.).

Figure 5B:
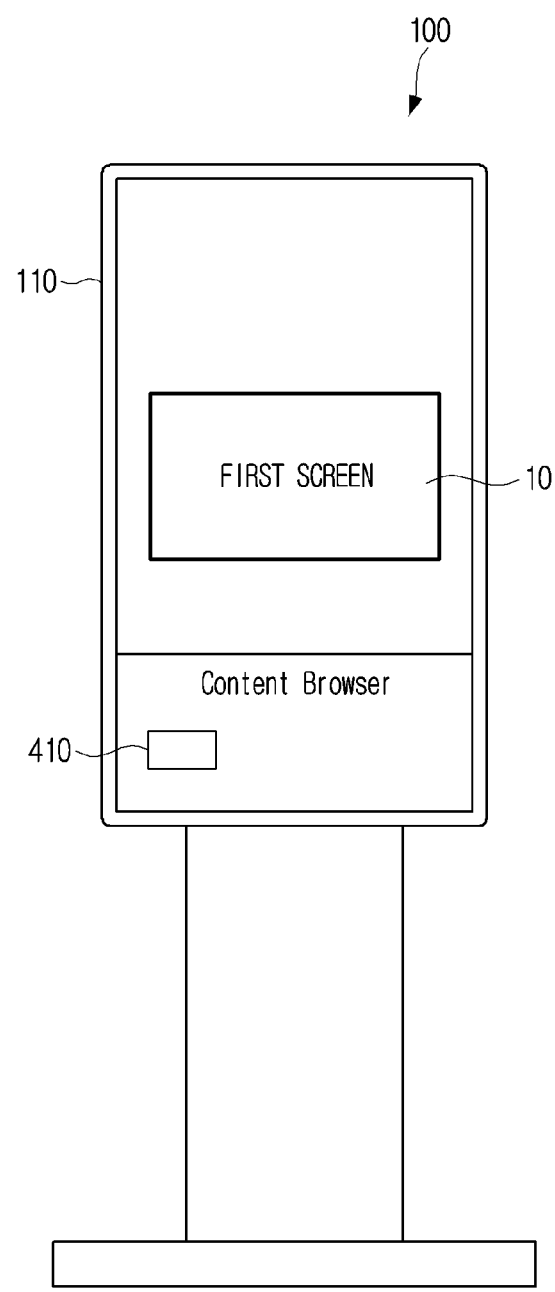

When a user command selecting an up button is input from the user input module 180 while the item included in the content browser area 410 is highlighted, the processor 140 may control the display 110 to move the highlight on the first screen 10 as shown in FIG. 5B.

Figure 5C:
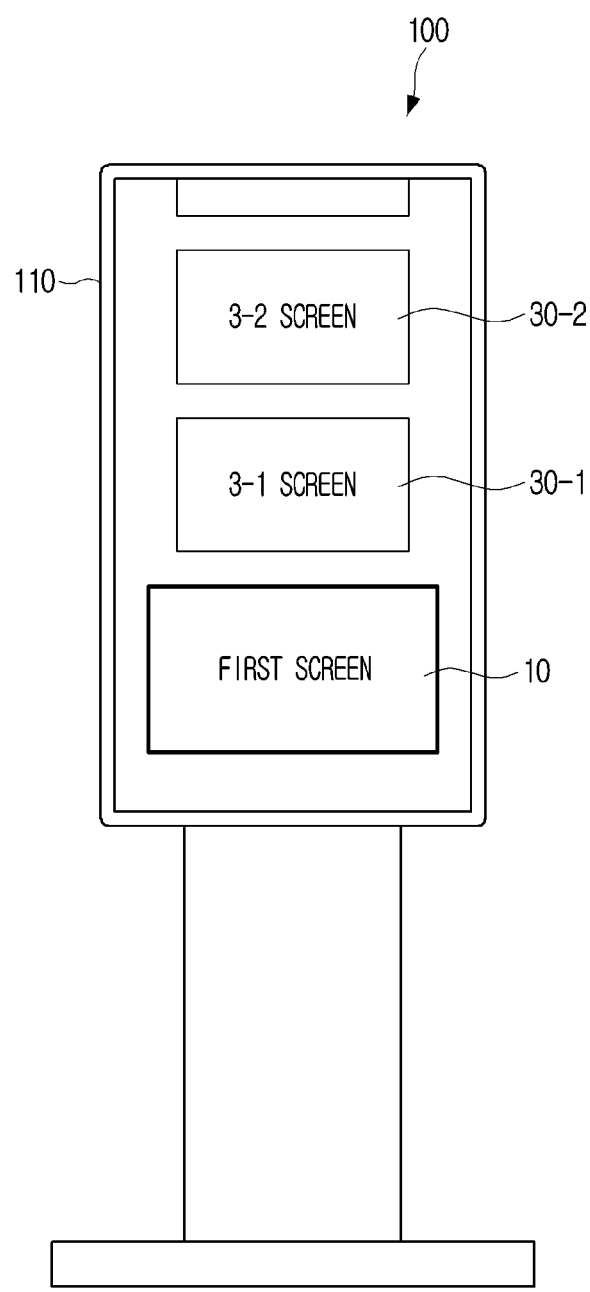

When a user command for selecting an upward orientation button is input from the user input module 180 while a highlight is displayed on the first screen 10, the processor 140 may remove the content browser area 410, move the first screen 10 to the bottom of the display 100, and control the display 110 to display a 3-1 screen 30-1, a 3-2 screen 30-2, and a 303 screen 30-3 on the top of the first screen 10 as shown in FIG. 5C. In FIG. 5C, the first screen 10, the 3-1 screen 30-1, the 3-2 screen 30-2, and the 3-3 screen 30-3 are all horizontal screens (that is, the horizontal length is greater than the vertical length), but this is only an embodiment, and the screen may be displayed as the vertical screen (e.g., the vertical length is longer than the horizontal length) depending on the type of content displayed on the screen.

In this case, the 3-1 screen 30-1 is a screen corresponding to the first content that the display apparatus 100 most recently played, the 3-2 screen 30-2 is a screen corresponding to a second content that the display apparatus 100 recently played for the second time, and the 3-3 screen 30-3 is a screen corresponding to a third content that the display apparatus 100 recently played for the third time. However, the 3-1 screen 30-1, the 3-2 screen 30-2, and the 3-3 screen 30-3 are arranged in the order of playback history of the corresponding content, but this is only an example embodiment and may be arranged based on the number of executions, recommendation ranking, or the like.

In addition, each of the 3-1 screen 30-1, the 3-2 screen 30-2, and the 3-3 screen 30-3 may include information on the corresponding content and information on a source providing the corresponding content. In other words, when the content is played through the display apparatus 100, the memory 130 may store information on the content and information on the source providing the content, and the processor 140 may store information about the pre-stored content and display information on a source that provides content (e.g., information on a storage area of a display apparatus where content is stored, information on an external device that provides content, information on an application that provides content) on a corresponding second screen The display 110 can be controlled to do so. For example, the processor 140 may display the title information of the most recently transmitted content, the thumbnail image of the most recently transmitted content, and the most recently transmitted content on the 3-1 screen 30-1. The display 110 may be controlled to display at least one of playback information (i.e., the last playback time, etc.) and detailed information (e.g., plot information, main character information, etc.) of the most recently transmitted content. In addition, the processor 140 may control the display 110 to display information on the source that provided the first content on the 3-1 screen 30-1.

When a user command input through the user input module 180 (e.g., an input for selecting an up button twice) is input, the processor 140 may move the highlight to the 3-2 screen 30-2. While the highlight moves to the 3-2 screen 30-2, the processor 140 may remove the first screen 10 and the 3-1 screen 30-1, and control the display 110 to display the 3-3 screen 30-3 and the 3-4 screen 30-4.

When a user command selecting an enter button is received through the user input module 180 while the highlight is displayed on the 3-2 screen 30-2, the processor 140 may access the stored source to play a second content corresponding to the 3-2 screen 30-2. For example, when the second content is stored in the memory 130 of the display apparatus 100, the processor 140 may access the memory 130 to play the second content. For another example, when the second content is provided from an external device, the processor 140 may communicate with the external device providing the second content, and receive the second content from the external device providing the second content to play the second content. For another example, when the second content is provided through the first application, the processor 140 may execute the first application and play the second content using the executed first application.

Figure 5D:
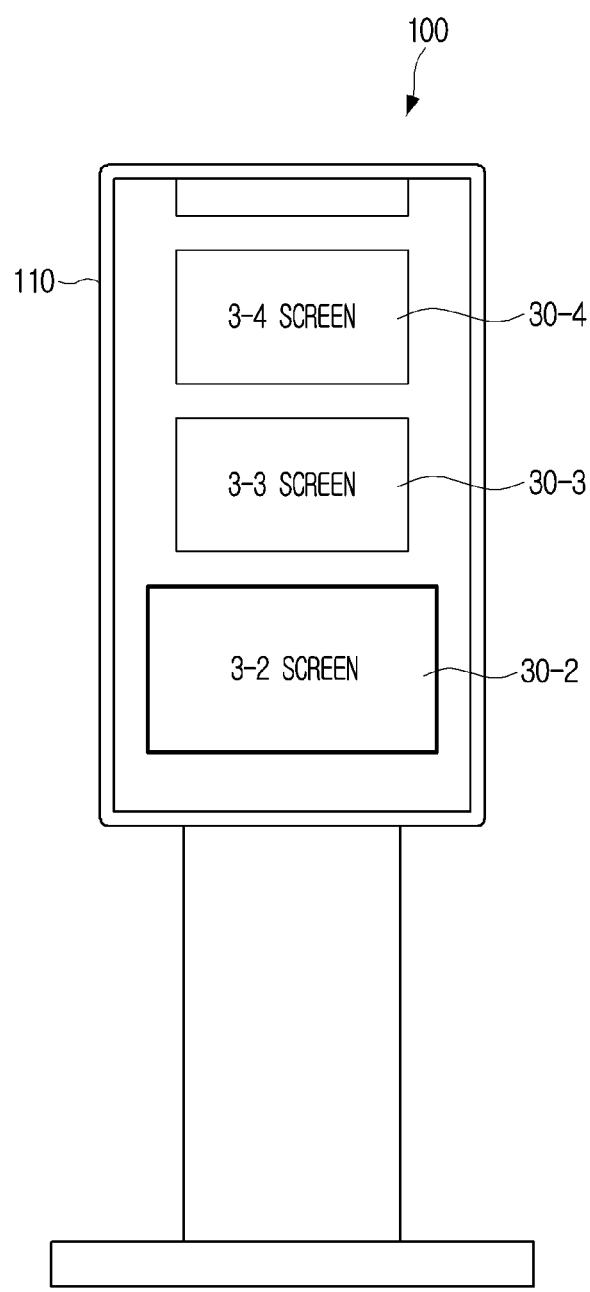
Figure 5E:
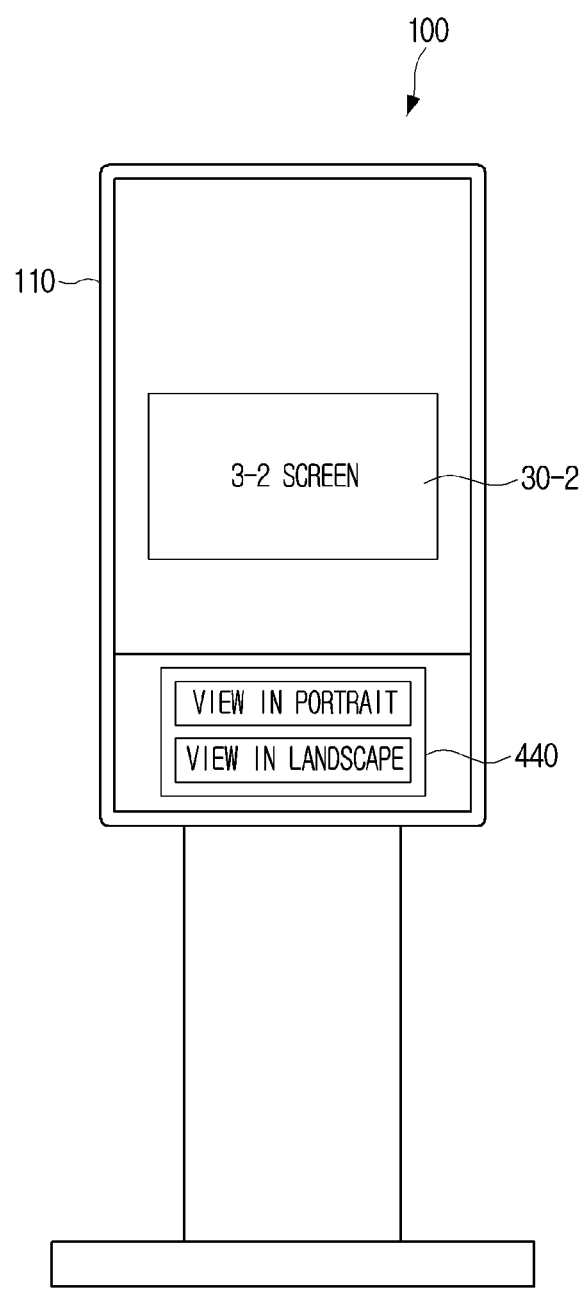

As shown in FIG. 5E, the processor 140 may display the 3-2 screen 30-2 on the display 110, and control the display 110 to display a message 440 inquiring about the display 110 orientation. In this case, the second content may be displayed on the 3-2 screen 30-2. The second content may be played from the time when it was recently played.

In addition, the processor 140 may control the motor 120 to automatically rotate the display 110 based on information on the second content. Specifically, when it is identified that the second content is an optimized when displayed in the horizontal orientation based on information (e.g., resolution, etc.) on the second content, the processor 140 may control the motor 120 to rotate the vertical display 110 to the horizontal orientation.

The processor 140 may rotate the display 110 based on a selection of the message 440 shown in FIG. 5E. For example, when the user selects "view in landscape", the processor 140 may control the motor 120 to rotate the vertical display 110 to the horizontal orientation.

As described above, as the display apparatus 100 provides information on at least one external device that recently provided content, the display apparatus 100 simultaneously browses a plurality of contents provided by the external device to find desired content more quickly, thereby improving user's convenience.

In the above-described example embodiments, the example embodiment of providing information on the external device recently connected to the display apparatus 100 and the example embodiment of providing information on recently played content on the display apparatus 100 are separately described, but these are only example embodiments, and the two embodiments may be implemented by combining the two embodiments. For example, as illustrated in FIG. 3D, when an input for selecting a left button is received while a highlight is displayed on the 2-2 screen 20-2, the processor 140 may display screens corresponding to a plurality of contents recently provided by the second external device.

In addition, the processor 140 may control the display apparatus 100 to operate in a multi-view mode capable of displaying a plurality of horizontal contents on the vertical display 110.

Figure 6A:
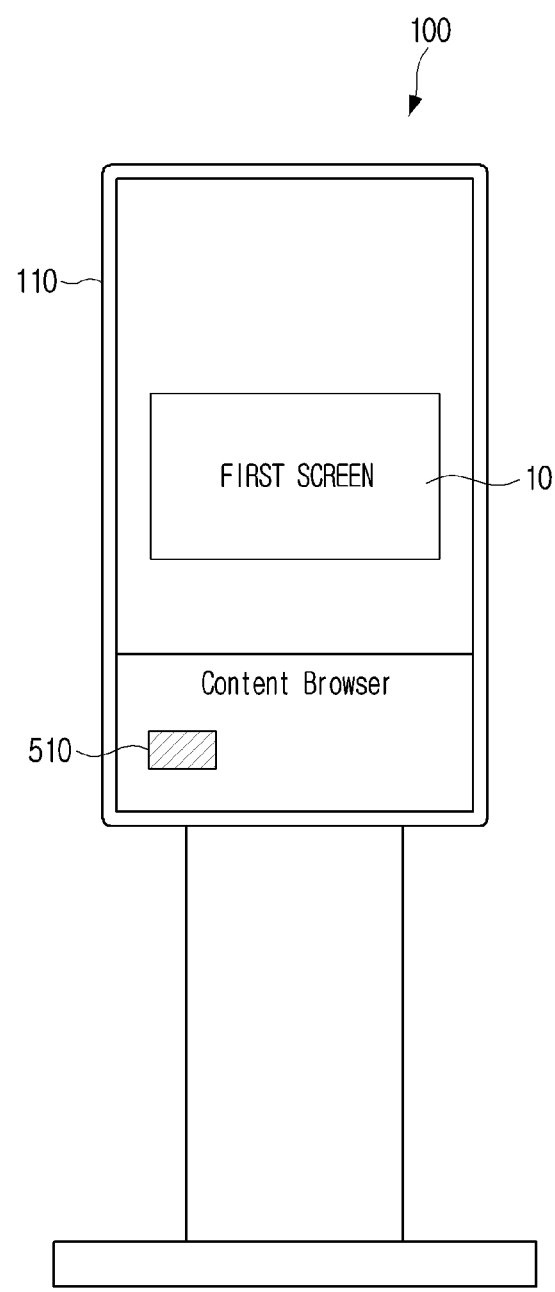
FIGS. 6A, 6B, 6C, 6D, 6E, 6F, and 6G are diagrams of a display apparatus showing a method in which the display apparatus displays a multiple screens according to an embodiment.

Specifically, as shown in FIG. 6A, the processor 140 may control the display 110 to display a content browser area 510 and a first screen 10 while the display apparatus 100 is placed in the first orientation (i.e., vertical orientation). In this case, a highlight may be placed on an item included in the content browser area 510. Also, the first content may by played on the first screen 10 or information (e.g., a title of the first content, a thumbnail of the first content, etc.) on the first content may be displayed.

Figure 6B:
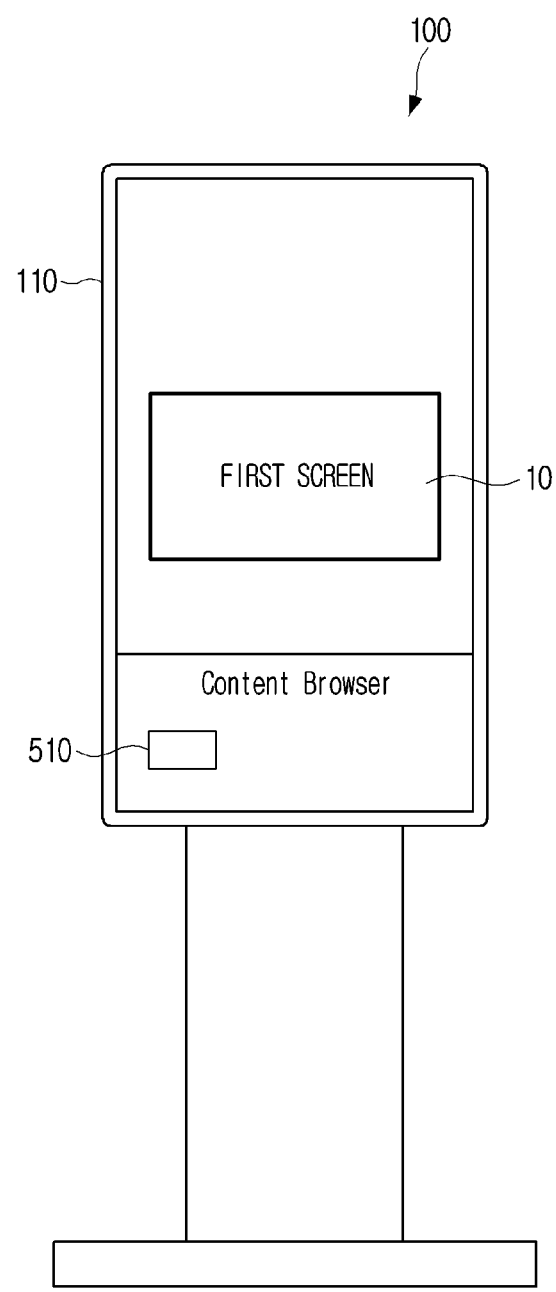

When an input for selecting an up button is input from the user input module 180 while a highlight is placed on an item included in the content browser area 510, the processor 140 may control the display 110 to move the highlight on the first screen 10, as shown in FIG. 6B.

Figure 6C:
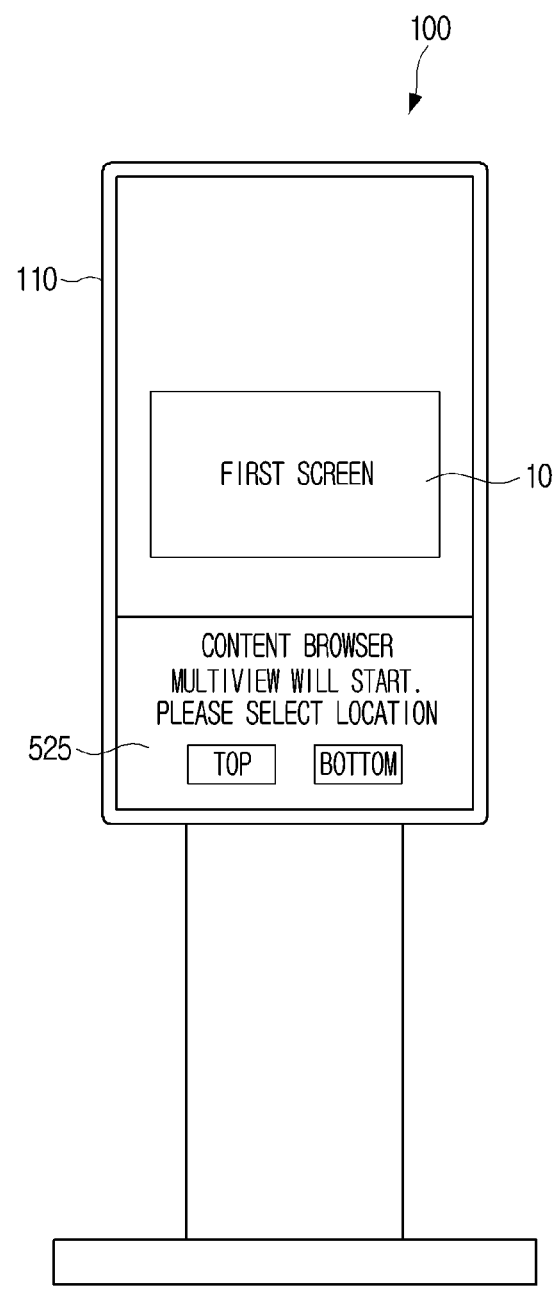

When an input for pressing the OK button for a threshold time) is input from the user input module 180 while a highlight is displayed on the first screen 10, the processor 140 may remove the content browser area 510 and display a message 525 that guides to enter the multi-view mode together with the first screen 10, as shown in FIG. 6C.

In this case, if an input for selecting an up button is input while the first screen 10 and the message 525 are displayed, the processor 140 may control the display 110 to display the first screen 10 on the upper area as shown in FIG. 5D, and control the display 110 to display a virtual screen area 530 on the lower area. When an input for selecting a down button is input while the first screen 10 and the message 525 are displayed, the processor 140 may control the display to display a virtual screen area 540 on the upper area, as shown in FIG. 6E, and display a first area 520 on the lower area.

Figure 6D:
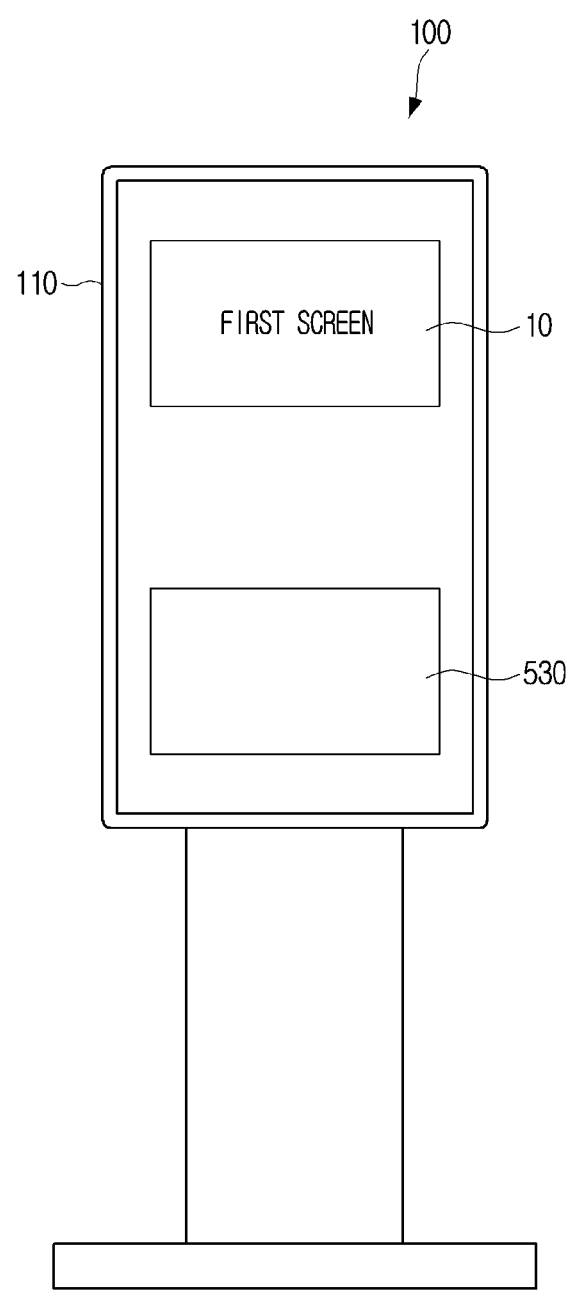
Figure 6E:
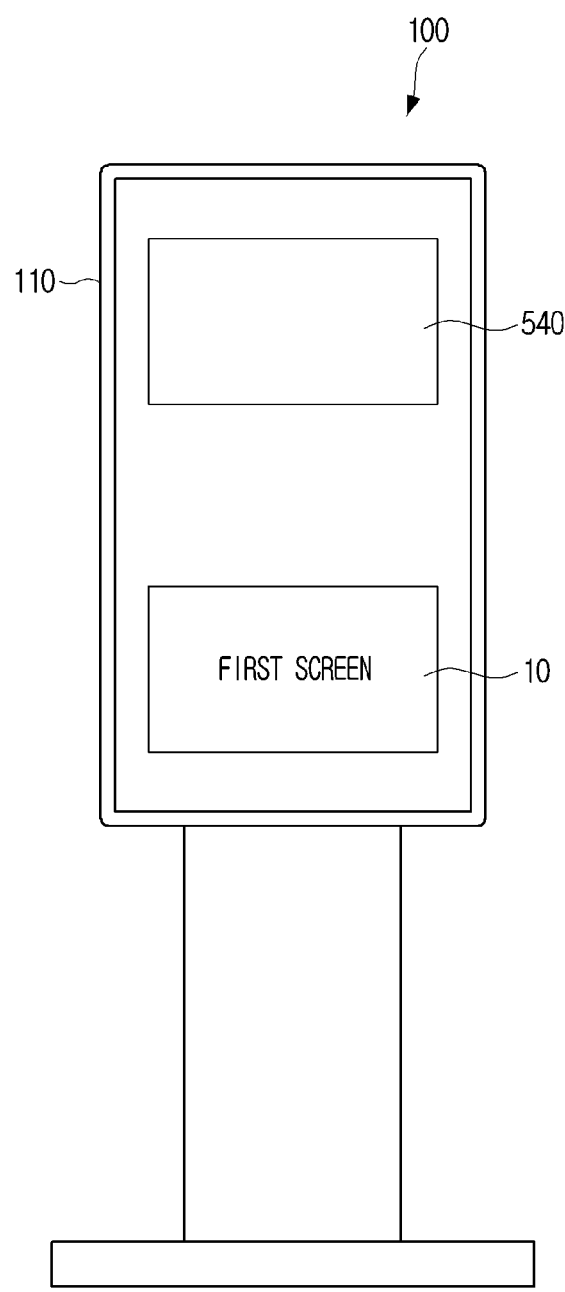
Figure 6F:
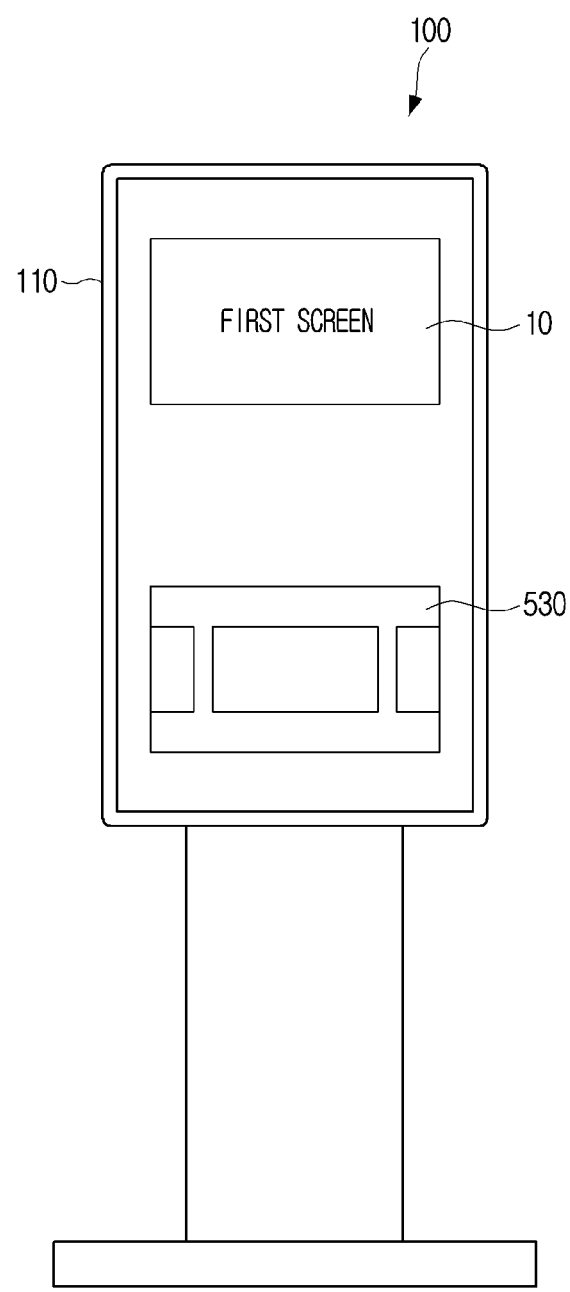
Figure 6G:
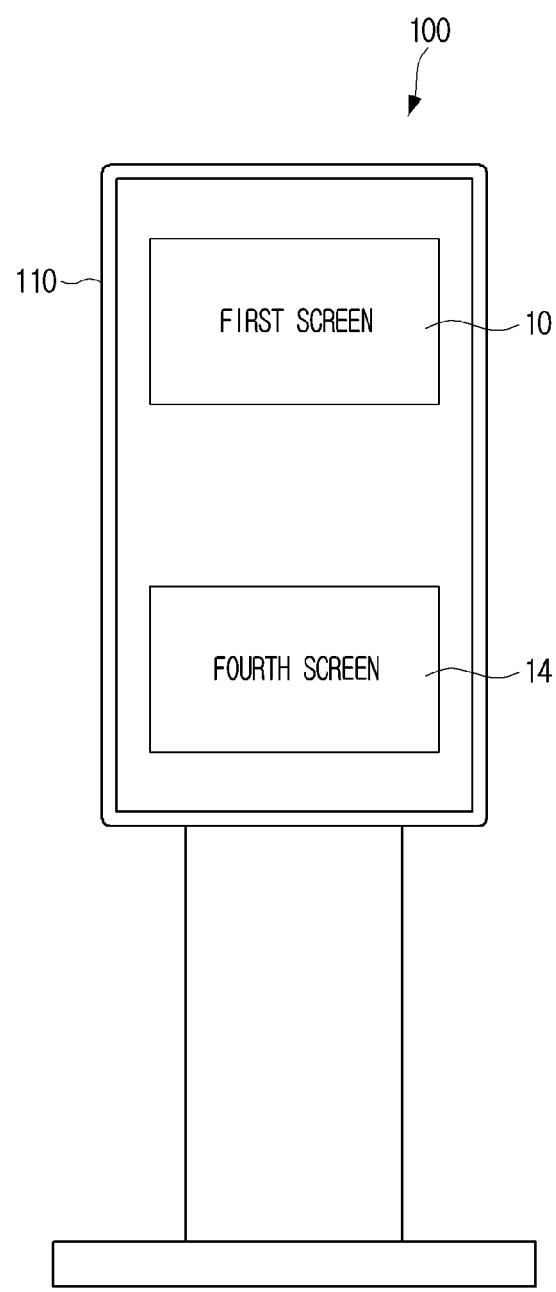

In addition, as shown in FIG. 6F, while the first screen 10 is displayed on the upper area and the virtual screen area 530 is displayed on the lower area, and an input for sequentially selecting the down button and the OK button is input from the user input module 180 to select a virtual screen area, the processor 140 may control the display 110 to display a UI for selecting content on the virtual screen area 530. In this case, the UI for selecting the content may include various contents such as recently played content, recommended contents, etc., and the UI may browse the content with left and right buttons.

When the user selects the content through the UI, the processor 140 may control the display 110 to display the first screen 10 to play the first content on the upper area and the fourth screen 15 playing the selected content on the lower area, as shown in FIG. 5G.

In this case, the location and size of the first screen 10 displayed on the upper area and the fourth screen 15 displayed on the lower area may be changed according to a user input, and only one of the first screen 10 and the fourth screen 15 may be played in full screen.

In the above-described example embodiment, the display apparatus 100 is controlled by a remote controller, but this is only an example embodiment, and the display apparatus 100 may be controlled through various input devices. For example, when a user voice saying "Please switch to multi-view" is input through the microphone 160 when the display is in the state of FIG. 6A, the processor 140 may recognize the user voice input through the voice recognition device and control the display 110 to display the first screen 10 on the upper area based on the recognition result, as shown in FIG. 6F, and display the UI for selecting content on the virtual screen area 530.

Further, the processor 140 may provide a UI that controls a screen provided by the display apparatus 100 while the display is placed in vertical orientation.

Figure 7A:
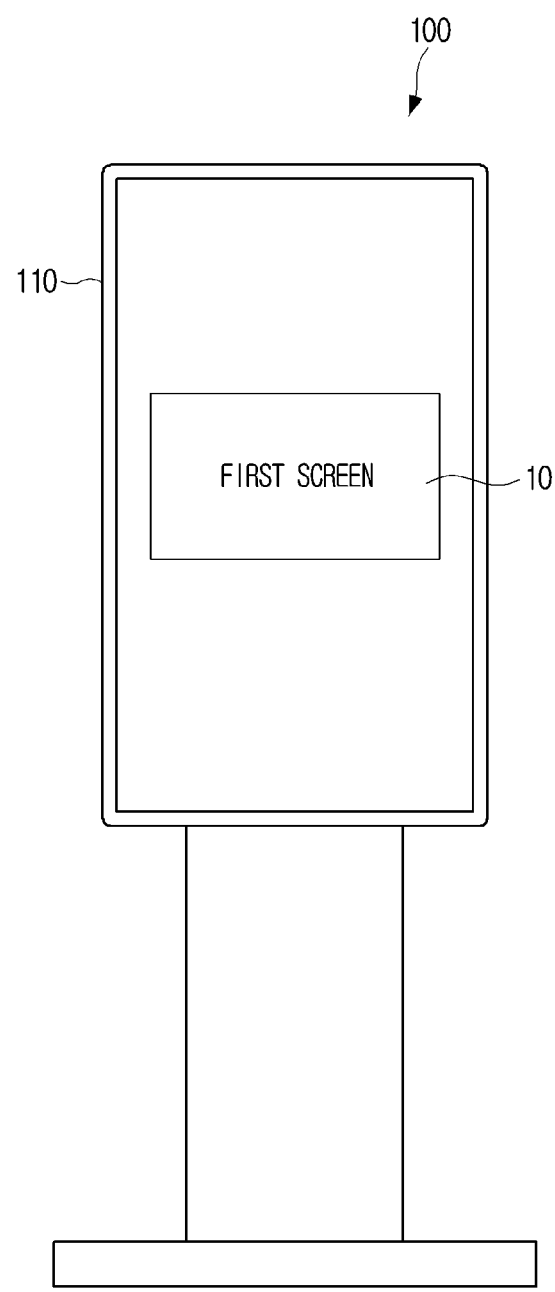

Specifically, the processor 140 may control the display 110 to display the first screen 10 while the display apparatus 100 is placed in the first orientation (i.e., vertical orientation), as shown in FIG. 7A. The first content or information (e.g., a title of the first content, a thumbnail of the first content, etc.) of the first content may be displayed on the first screen 10.

Figure 7B:
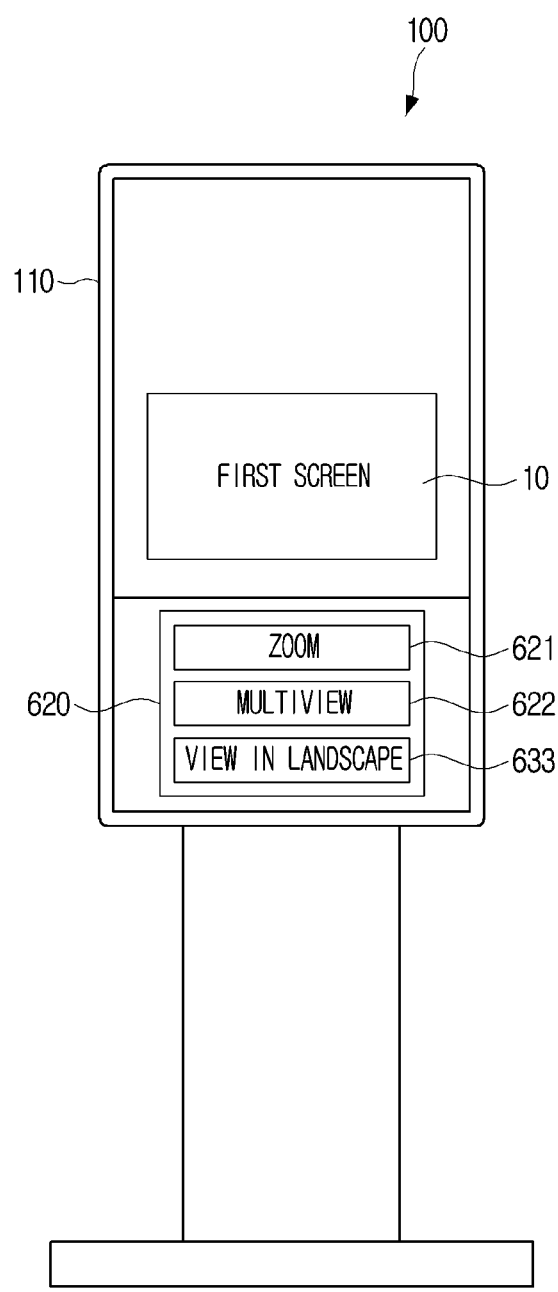

When an input for pressing a return button for a predetermined time is input from the user input module 180 while the first screen 10 is displayed, the processor 140 may control the display 110 to display a UI 620 for controlling the first screen 10. In this case, the UI 620 may include a first UI element 621 for performing a zoom operation, a second UI element 622 for operating in a multi-view mode, and a third UI element 623 to view in horizontal orientation, as shown in FIG. 7B.

Figure 7C:
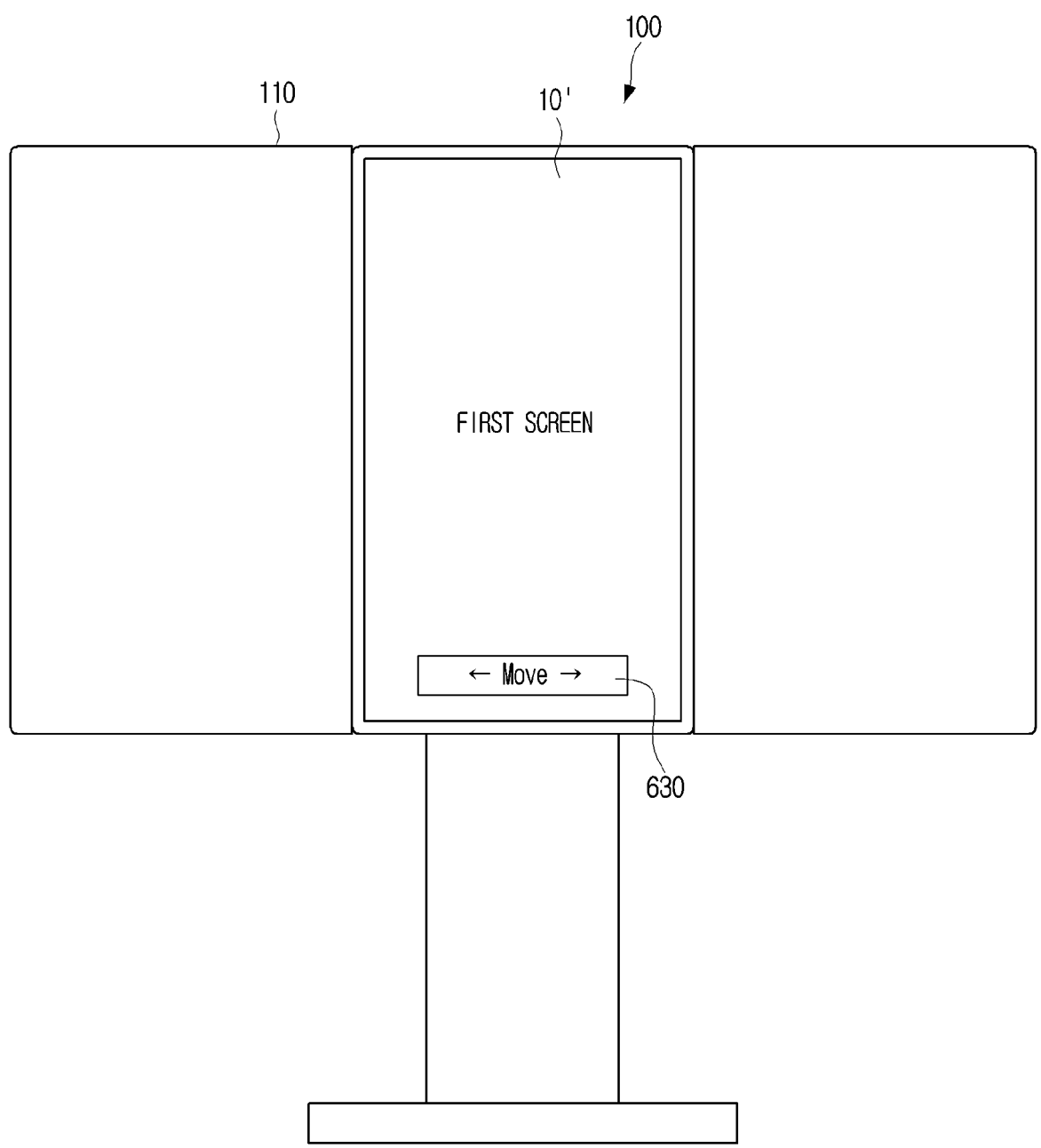

When the first UI element 621 for performing a zoom operation is selected, the processor 140 may control the display 110 to enlarge the first screen, as shown in FIG. 7C, and display only a first partial area of the enlarged first screen (e.g., a center area 10'). In this case, the processor 140 may control the display 110 to enlarge the first screen 10 so that the horizontal length of the first screen 10 is equal to the vertical length of the display 110. In addition, the processor 140 may control the display 110 to display an indicator 630 indicating that the partial area of the enlarged first screen is movable left and right.

When a an input for selecting a left button is input through the user input module 180 while the indicator 630 is displayed, the processor 140 may control the display 110 to move the partial area displayed on the enlarged first screen to the left and to display a second partial area (e.g., a left area 10") of the first screen, as shown in FIG. 6D.

Figure 7E:
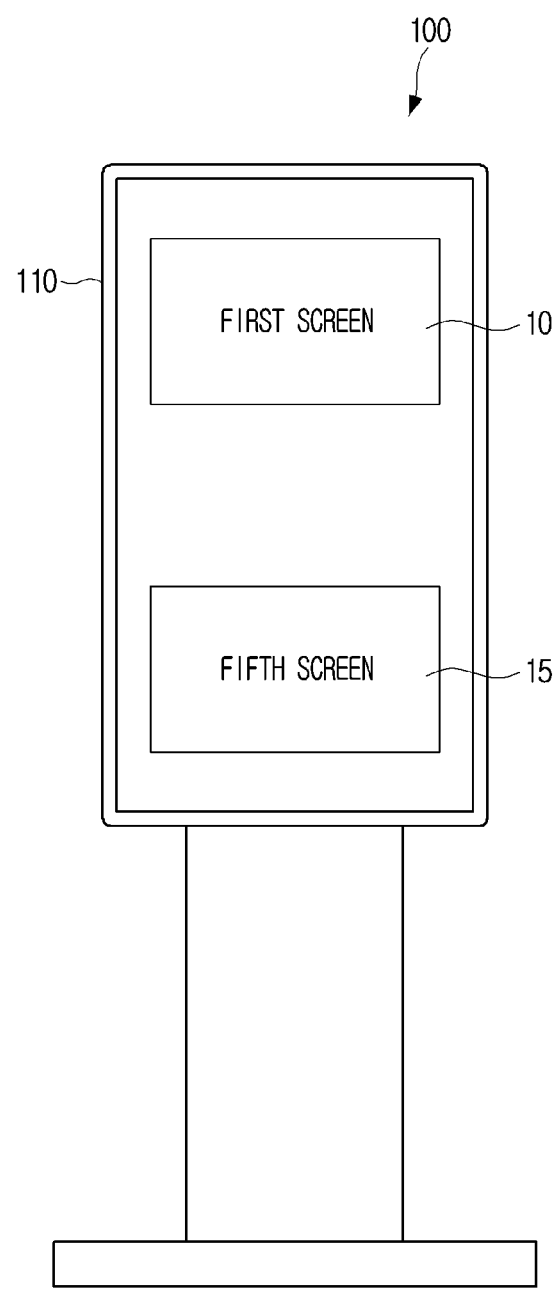

When the second UI element 622 for operating in the multi-view mode is selected, the processor 140 may control the display 110 to display the first screen 10 on the upper area, as shown in FIG. 7E, and to display a new fifth screen 15 in the lower area.

Figure 7F:
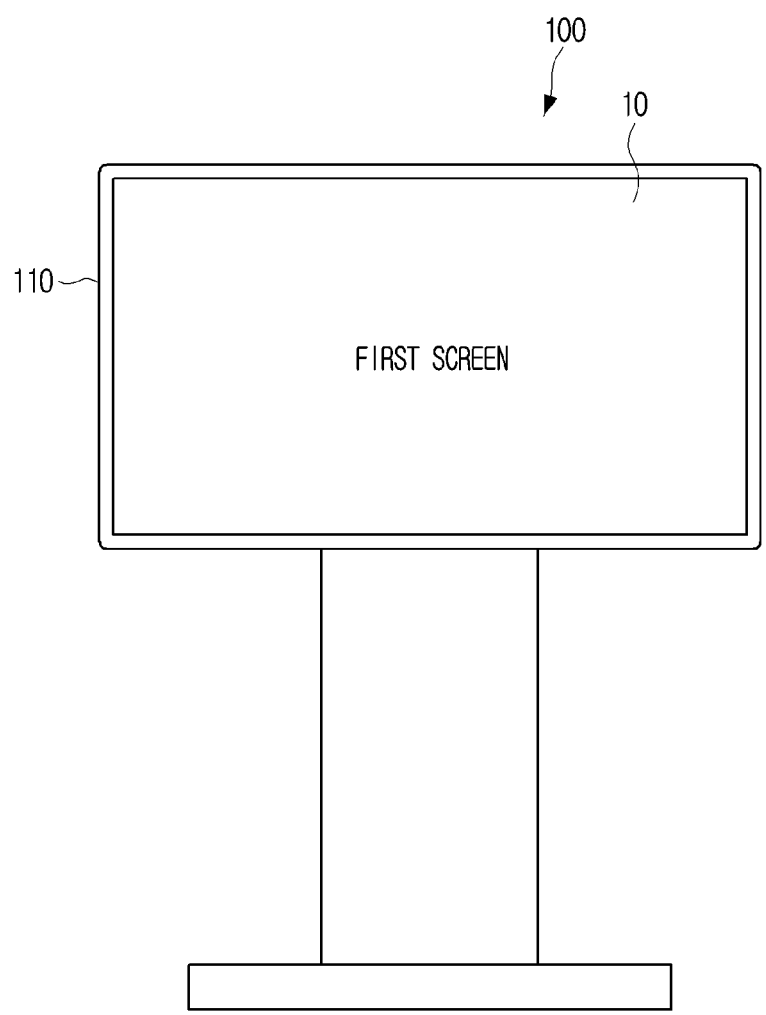

When the third UI element 623 to view in horizontal orientation is selected, the processor 140 may control the motor 120 to rotate the display 110 from the vertical orientation to the horizontal orientation, as shown in FIG. 7F, and control the display 110 to display the enlarged first screen 10 on the horizontal display 110.

As described above, according to various example embodiments of the disclosure, users who use the vertical display apparatus may receive various user experiences.

Figure 8:
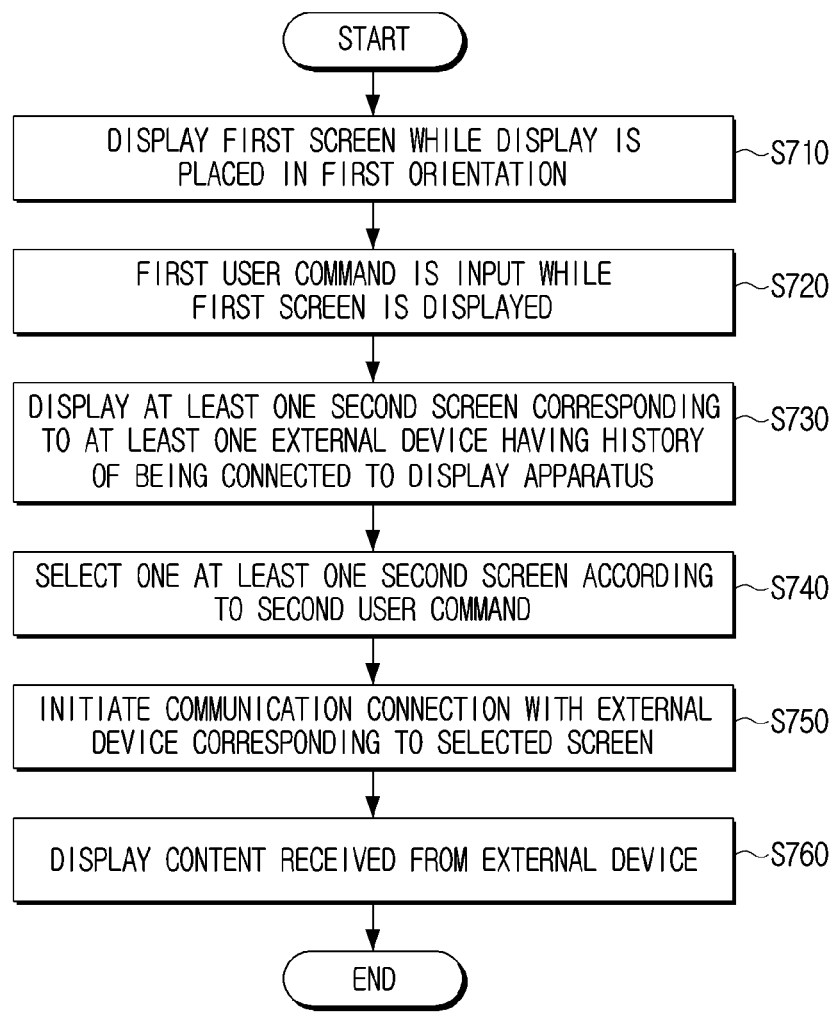
FIG. 8 is a flowchart of a method for controlling a display apparatus according to an embodiment.

FIG. 8 is a flowchart showing a method of controlling a display apparatus according to an embodiment.

The display apparatus 100 may display the first screen while the display is placed in the first orientation (operation S710). In this case, the first orientation may be vertical orientation, and the first screen may be a horizontal screen.

The display apparatus 100 may receive a first user command while the first screen is displayed (operation S720). The first user command may be an input for selecting a specific orientation.

The display apparatus 100 may display at least one second screen corresponding to at least one external device having a history of being connected to the display apparatus 100 (operation S730). In this case, the second screen may include information on content provided by the corresponding external device and information on the external device.

The display apparatus 100 may select one of the at least one second screen according to a second user command (operation S740).

The display apparatus 100 may communicate with an external device corresponding to the selected screen (operation S750). Specifically, the display apparatus 100 may initiate a communication connection with an external device based on information on a pre-stored external device.

The display apparatus 100 may display content received from an external device (operation S760). In this case, the content received from the external device may be the most recently transmitted content from the external device, and the display apparatus 100 may rotate the display 110 based on information on the most recently transmitted content to display the content.

According to the example embodiment described above, the user may more easily browse recently connected external devices and recently viewed content, thereby improving usability of the display apparatus.

The respective components (e.g., module or program) according to the various example embodiments may include a single entity or a plurality of entities, and some of the corresponding sub-components described above may be omitted, or another sub-component may be further added to the various example embodiments. Alternatively or additionally, some components (e.g., module or program) may be combined to form a single entity which performs the same or similar functions as the corresponding elements before being combined. Operations performed by a module, a program, or other component, according to various exemplary embodiments, may be sequential, parallel, or both, executed iteratively or heuristically, or at least some operations may be performed in a different order, omitted, or other operations may be added.

Operations performed by a module, a program module, or other component, according to various exemplary embodiments, may be sequential, parallel, or both, executed iteratively or heuristically, or at least some operations may be performed in a different order, omitted, or other operations may be added.

The term "module" as used herein includes units made up of hardware, software, or firmware, and may be used interchangeably with terms such as logic, logic blocks, components, or circuits. A "module" may be an integrally constructed component or a minimum unit or part thereof that performs one or more functions. For example, the module may be composed of application-specific integrated circuit (ASIC).

According to an example embodiment of the disclosure, the various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions.

When the instructions are executed by a processor, the processor may directory perform functions corresponding to the instructions using other components or the functions may be performed under a control of the processor. The instructions may include code generated or executed by a compiler or an interpreter.

The machine-readable storage media may be provided in a form of a non-transitory storage media. The 'non-transitory' means that the storage media does not include a signal and is tangible, but does not distinguish whether data is stored semi-permanently or temporarily in the storage media.

In addition, according to an example embodiment of the disclosure, the methods according to various embodiments described above may be provided as a part of a computer program product. The computer program product may be traded between a seller and a buyer.

The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media, such as a manufacturer's server, the application store's server, or a memory in a relay server.

The foregoing example embodiments are merely exemplary and are not to be construed as limiting the disclosure. The present teaching may be readily applied to other types of apparatuses. Also, the description of the exemplary embodiments of the disclosure is intended to be illustrative, and not to limit the scope of the claims, and many alternatives, modifications, and variations will be apparent to those skilled in the art.

What is claimed is:

1. A display apparatus comprising:
   a communication module comprising circuitry;
   a display;
   a motor configured to rotate the display to a horizontal orientation or a vertical orientation;
   a user input module;
   a memory storing at least one instruction; and
   a processor configured to be in communication with the communication module, the display, the motor, the user input module, and the memory to control the display apparatus;
   wherein the processor, upon execution of the stored at least one instruction, is further configured to:
      control the display to display a first screen based on the display being placed in the horizontal orientation,
      in response to a first user command being input through the user input module while the first screen is displayed, control the display to display a plurality of screens corresponding to a plurality of applications that were displayed on the display, wherein each of the plurality of screens includes information on a display orientation corresponding to the vertical orientation or the horizontal orientation, and
      in response to a second user command being input through the user input module while the plurality of screens are displayed,
      based on the second user command being a command selecting a second screen among the plurality of screens and a display orientation corresponding to the selected second screen being the vertical orientation, control the motor to rotate the display to the vertical orientation and execute an application corresponding to the selected second screen, and
      based on the second user command being a command selecting a third screen among the plurality of screens and a display orientation corresponding to the selected third screen being the horizontal orientation, execute an application corresponding to the selected third screen.

2. The apparatus of claim 1, wherein the processor is further configured to, based on the second screen being selected, control the display to display content corresponding to the selected second screen.

3. The apparatus of claim 2, wherein the processor is further configured to, based on the selected second screen corresponding to an external device having a history of being connected to the display apparatus, control the communication module to initiate a communication connection with the external device corresponding to the selected second screen and control the display to display content received from the corresponding external device through the communication module.

4. The apparatus of claim 3, wherein the processor is further configured to store, in the memory, at least one of title information on the content, a thumbnail of the content, play information on the content, and detailed information on the content transmitted by the corresponding external device to the display apparatus, wherein each of the plurality of screens is configured to display at least one of title information on content recently transmitted by the corresponding external device, a thumbnail of the content recently transmitted by the corresponding external device, playback information on the content recently transmitted by the corresponding external device, and detailed information on the content recently transmitted by the corresponding external device.

5. The apparatus of claim 4, wherein the content received through the communication module from the corresponding external device is a content most recently played by the external device.

6. The apparatus of claim 5, wherein the processor is further configured to, based on a screen form of the content most recently transmitted by the external device being in a second orientation, control the motor to rotate a display orientation to the second orientation.

7. The apparatus of claim 3, wherein each of the plurality of screens is configured to display communication connection information for a corresponding external device, and wherein the processor is further configured to, based on the external device corresponding to the selected second screen being disconnected from the communication module, control the display to display a message inquiring about a communication connection with the external device corresponding to the selected second screen.

8. The apparatus of claim 3, wherein the processor is further configured to, based on a third user command being input through the user input module while a highlight is displayed on one of the plurality of screens, control the display to display at least one screen corresponding to at least one content recently played through the external device corresponding to the highlighted screen.

9. The apparatus of claim 3, wherein the processor is further configured to, based on a third user command being input through the user input module while the first screen is displayed, control the display to display at least one screen corresponding to at least one content recently played on the display apparatus.

10. The apparatus of claim 9, wherein the processor is further configured to, based on the at least one screen being selected, control the display to display a UI inquiring about changing the display orientation for playing content corresponding to the at least one screen.

11. The apparatus of claim 3, wherein the processor is further configured to, based on a third user command being input through the user input module while the first screen is displayed, display a fourth screen with the first screen to operate in a multi-view mode.

12. The apparatus of claim 1, wherein the second screen is configured to display at least one of a thumbnail corresponding to an internal content stored in the memory and a thumbnail corresponding to content received from an external device.

13. A method of controlling a display apparatus including a display and a motor configured to rotate the display to a horizontal orientation or a vertical orientation, the method comprising:

displaying a first screen based on the display being placed in the horizontal orientation;

displaying, in response to a first user command being input through a user input module while the first screen is displayed, plurality of screens corresponding to a plurality of applications that were displayed on the display, wherein each of the plurality of screens includes information on a display orientation corresponding to the vertical orientation or the horizontal orientations, and in response to a second user command being input through the user input module while the plurality of screens are displayed, based on the second user command being a command selecting a second screen among the plurality of screens and a display orientation corresponding to the selected second screen being the vertical orientation, controlling the motor to rotate the display to the vertical orientation and executing an application corresponding to the selected second screen, and based on the second user command being a command selecting a third screen among the plurality of screens and a display orientation corresponding to the selected third screen being the horizontal orientation, executing an application corresponding to the selected third screen.

14. The method of claim 13, further comprising:

storing at least one of title information on the received content, a thumbnail of the received content, play information on the received content, and detailed information on the received content transmitted by the corresponding external device to the display apparatus; and displaying, on each of the plurality of screens, at least one of title information on content recently transmitted by the corresponding external device, a thumbnail of the content recently transmitted by the corresponding external device, playback information on the content recently transmitted by the corresponding external device, and detailed information on the content recently transmitted by the corresponding external device.

15. The method of claim 14, further comprising:

based on a screen form of the content most recently transmitted by the corresponding external device being in a second orientation, controlling the motor to rotate the display to the second orientation.

16. The method of claim 14, wherein the content received through a communication module from the corresponding external device is a content most recently played by the corresponding external device.

17. The method of claim 13, wherein, based on the selected second screen corresponding to an external device having a history of being connected to the display apparatus, the displaying the content comprises initiating a communication connection with the external device corresponding to the selected second screen and displaying a received content from the corresponding external device.

* * * * *